(12) United States Patent
Thomas et al.

(10) Patent No.: US 11,059,453 B2
(45) Date of Patent: Jul. 13, 2021

(54) SYSTEM AND METHOD FOR DETERMINING SEATBELT ROUTING

(71) Applicant: GM Global Technology Operations LLC, Detroit, MI (US)

(72) Inventors: Scott D. Thomas, Novi, MI (US); Jeffrey J. Schultz, Grand Blanc, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 179 days.

(21) Appl. No.: 16/389,504

(22) Filed: Apr. 19, 2019

(65) Prior Publication Data

US 2020/0331429 A1 Oct. 22, 2020

(51) Int. Cl.
  *B60R 22/48* (2006.01)
  *B60N 2/00* (2006.01)
  *B60R 22/34* (2006.01)

(52) U.S. Cl.
  CPC .............. *B60R 22/48* (2013.01); *B60N 2/002* (2013.01); *B60R 22/34* (2013.01); *B60R 2022/485* (2013.01); *B60R 2022/4816* (2013.01); *B60R 2022/4825* (2013.01); *B60R 2022/4833* (2013.01)

(58) Field of Classification Search
  CPC . B60R 22/34; B60R 22/48; B60R 2022/4816; B60R 2022/4825; B60R 2022/4833
  See application file for complete search history.

(56) References Cited

U.S. PATENT DOCUMENTS

| | | | | |
|---|---|---|---|---|
| 5,611,604 A | * | 3/1997 | Thomas | B60R 22/26 297/478 |
| 6,477,753 B1 | * | 11/2002 | Burke | B60R 22/48 24/303 |
| 2007/0282505 A1 | * | 12/2007 | Bolton | B60R 22/02 701/45 |
| 2015/0251618 A1 | * | 9/2015 | Ghannam | B60R 22/48 340/457.1 |
| 2016/0214554 A1 | * | 7/2016 | Shimazu | B60R 22/03 |
| 2017/0296128 A1 | * | 10/2017 | Aoki | A61B 5/1135 |

* cited by examiner

*Primary Examiner* — James A English
(74) *Attorney, Agent, or Firm* — Vivacqua Crane

(57) ABSTRACT

A system and method for detecting seatbelt routing in a motor vehicle safety restraint system for a motor vehicle seat. The system includes a seatbelt buckle sensor, a seatbelt payout sensor, an occupancy sensor, an automatic locking retractor sensor and a control module. The method includes sensing a presence of a seatbelt latchplate in a seatbelt buckle. Further, the method includes sensing a seatbelt payout length. Additionally, the method includes comparing the seatbelt payout length to a first seatbelt payout length threshold. Moreover, the method includes determining seatbelt routing based on whether seatbelt latchplate is present in the seatbelt buckle and the seatbelt payout length is greater than the first seatbelt payout length threshold.

20 Claims, 9 Drawing Sheets

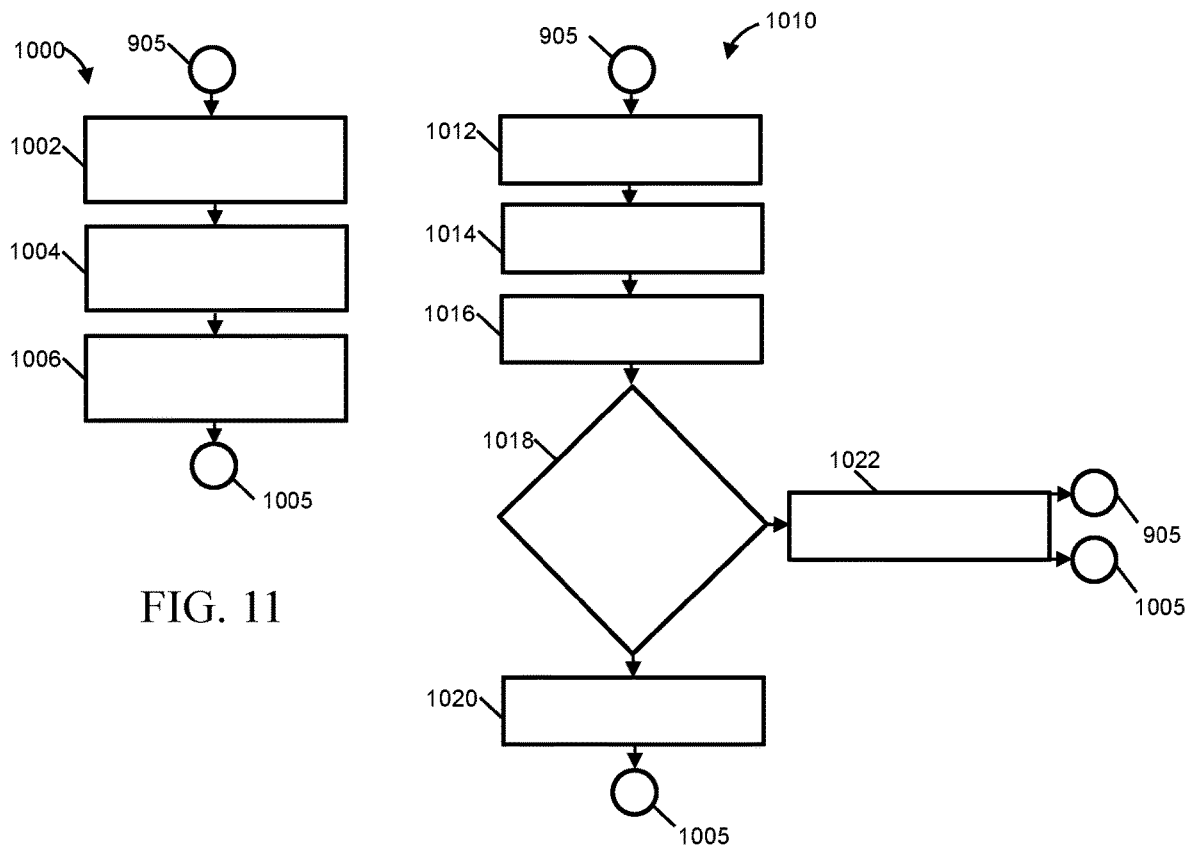
FIG. 11
FIG. 12
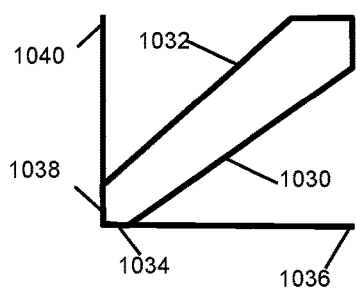
FIG. 13

SYSTEM AND METHOD FOR DETERMINING SEATBELT ROUTING

INTRODUCTION

The present disclosure relates to seatbelt retractor systems and methods for detecting seatbelt webbing routing from a seatbelt retractor to a seatbelt buckle.

Seatbelt systems for restraining occupants in a motor vehicle, generally, employ seatbelt retractors. The seatbelt retractors have a spool around which a seatbelt webbing is wound. The seatbelt webbing may be unwound from the spool by a vehicle occupant and secured around the vehicle occupant by inserting a latch plate coupled to the seatbelt webbing into a seatbelt buckle. When not in use the seatbelt retractor through the aid of a spring retracts the seatbelt webbing into one or more retractor spools. Moreover, seatbelt systems have employed a sensor in the seatbelt buckle to determine whether an occupant is belted. If the occupant is unbelted a warning is provided to the occupant to prompt the occupant to buckle their seatbelt.

Thus, while current seatbelt systems achieve their intended purpose, there is a need for a new and improved system and method for securing vehicle occupants and child restraint seats with a seatbelt. The new and improved method should be capable of determining seatbelt routing and providing a warning to the vehicle occupant or taking an appropriate ride action when incorrect seatbelt routings are detected.

SUMMARY

According to several aspects, a system and method for detecting seatbelt routing in a motor vehicle safety restraint system for a motor vehicle seat is provided. The system includes a seatbelt buckle sensor, an seatbelt payout sensor, an occupancy sensor, an automatic locking retractor sensor and a control module. The control module includes executable code to implement the method of the present disclosure. The method includes sensing a presence of a seatbelt latchplate in a seatbelt buckle. Further, the method includes sensing a seatbelt payout length. Additionally, the method includes comparing the seatbelt payout length to a first seatbelt payout length threshold. Moreover, the method includes determining seatbelt routing based on whether seatbelt latchplate is present in the seatbelt buckle and the comparison of the seatbelt payout length with the first seatbelt payout length threshold.

In accordance with another aspect of the present disclosure, the method further includes determining that a small person is properly belted when the presence of the seatbelt latchplate in the seatbelt buckle is sensed, the seatbelt payout length after the presence of the seatbelt latchplate in the seatbelt buckle is sensed is less than the first seatbelt payout length threshold after the presence of the seatbelt latchplate in the seatbelt buckle is sensed.

In accordance with another aspect of the present disclosure, the method further includes determining that the motor vehicle safety restraint system is not in use, when the presence of a seatbelt latchplate in the seatbelt buckle is sensed, the seatbelt payout length after the presence of a seatbelt latchplate in the seatbelt buckle is sensed is between a second seatbelt payout length threshold and a third seatbelt payout length threshold.

In accordance with another aspect of the present disclosure, the method further includes determining at least one of a small person is improperly belted and a small object is properly belted, when the presence of a seatbelt latchplate in the seatbelt buckle is sensed, the seatbelt payout length after the presence of a seatbelt latchplate in the seatbelt buckle is sensed is not between the second seatbelt payout length threshold and the third seatbelt payout length threshold, the seatbelt payout length after the presence of a seatbelt latchplate in the seatbelt buckle is sensed is not less than the third seatbelt payout length threshold and the automatic locking retractor was engaged after the presence of a seatbelt latchplate in the seatbelt buckle is sensed.

In accordance with another aspect of the present disclosure, the method further includes determining that at least one of a wrong latchplate is inserted in the seatbelt buckle and a fake latch plate is inserted in the seatbelt buckle, when the presence of a seatbelt latchplate in the seatbelt buckle is sensed, and the seatbelt payout length after the presence of a seatbelt latchplate in the seatbelt buckle is sensed is less than the second seatbelt payout length threshold.

In accordance with another aspect of the present disclosure, the method further includes determining whether an occupant is present in the motor vehicle seat using an occupancy sensor.

In accordance with another aspect of the present disclosure, the method further includes determining at least one of an improperly restrained large person and a properly restrained large object, when the seatbelt is determined to be buckled, the seatbelt payout is greater than or equal to the first seatbelt payout length threshold, when an occupant is determined to be present in the vehicle seat at the time of the latchplate is inserted into the buckle, when after the presence of a seatbelt latchplate in the seatbelt buckle is sensed the occupant is present in the motor vehicle seat more than a time period threshold within a time period window and the automatic locking retractor was engaged after the presence of a seatbelt latchplate in the seatbelt buckle is sensed.

In accordance with another aspect of the present disclosure, the method further includes determining at least one of a properly belted large person and an improperly belted large object, when the presence of a seatbelt latchplate in the seatbelt buckle is sensed, the seatbelt payout length is greater than or equal to the first seatbelt payout length, an occupant is determined to be present in the vehicle seat, after the presence of the seatbelt latchplate in the seatbelt buckle is sensed the occupant is present in the seat more than the time period threshold and within the time period window.

In accordance with another aspect of the present disclosure, the method further includes determining at least one of an improperly belted child restraint seat and an improperly belted object when the presence of the seatbelt latchplate in the seatbelt buckle is sensed, the seatbelt payout is greater than or equal to the first seatbelt payout length threshold, an occupant is determined to be present in the motor vehicle seat, after the presence of the seatbelt latchplate in the seatbelt buckle is sensed the occupant is not present in the seat more than the time period threshold within the time period window and the automatic locking retractor was not engaged after the seatbelt was buckled.

In accordance with another aspect of the present disclosure, the method further includes determining at least one of an improperly belted child restraint seat and an improperly belted object when the presence of the seatbelt latchplate in the seatbelt buckle is sensed, the seatbelt payout is greater than or equal to the first seatbelt payout length threshold, an occupant is determined to not be present in the vehicle seat, and the automatic locking retractor was not engaged after the seatbelt was buckled.

In accordance with another aspect of the present disclosure, the method further includes determining at least one of a properly belted child restraint seat and a properly belted object when the presence of a seatbelt latchplate in the seatbelt buckle is sensed, the seatbelt payout length is greater than or equal to the first seatbelt payout length threshold, an occupant is present in the motor vehicle seat, when after the presence of the seatbelt latchplate in the seatbelt buckle is sensed the occupant was not present in the motor vehicle seat more than a time period threshold within a time period window, the automatic locking retractor was not engaged after the presence of the seatbelt latchplate in the seatbelt buckle is sensed and when after buckling the seatbelt payout length is increased by more than the first predetermined seatbelt payout length threshold and less than a second predetermined seatbelt payout length threshold within a time period window.

In accordance with another aspect of the present disclosure, the method further includes determining at least one of a child restraint seat is properly restrained and an object is properly restrained when the seatbelt is determined to be buckled, the seatbelt payout length is greater than or equal to the first seatbelt payout length threshold, when an occupant is not present in the motor vehicle seat, the automatic locking retractor was not engaged after the presence of the seatbelt latchplate in the seatbelt buckle is sensed and after the presence of the seatbelt latchplate in the seatbelt buckle is sensed the seatbelt payout length increased by more than the first seatbelt payout length threshold and less than a second seatbelt payout length threshold within a time period window.

In accordance with another aspect of the present disclosure, the method further includes determining at least one of a child restraint seat is properly restrained and an object is properly restrained when the presence of the seatbelt latchplate in the seatbelt buckle is sensed, the seatbelt payout length is greater than or equal to the first seatbelt payout length threshold, an occupant is present in the motor vehicle seat, after the presence of the seatbelt latchplate in the seatbelt buckle is sensed the occupant was not present in the seat more than a time period threshold within a time period window, and the automatic locking retractor was engaged after the presence of the seatbelt latchplate in the seatbelt buckle is sensed.

In accordance with another aspect of the present disclosure, the method further includes determining at least one of a child restraint seat is properly restrained and an object is properly restrained when the presence of the seatbelt latchplate in the seatbelt buckle is sensed, the seatbelt payout length is greater than or equal to the first seatbelt payout length, when an occupant is not present in the motor vehicle seat, and the automatic locking retractor was engaged after the presence of the seatbelt latchplate in the seatbelt buckle is sensed.

In accordance with another aspect of the present disclosure, the method further includes determining at least one of an improperly belted small person and a properly belted small object, when the presence of the seatbelt latchplate in the seatbelt buckle is sensed, and after the presence of the seatbelt latchplate in the seatbelt buckle is sensed the seatbelt payout length is less than a second seatbelt payout length threshold.

In accordance with another aspect of the present disclosure, the method further includes determining an improperly belted child restraint seat, when the seatbelt payout length is not greater than or equal to the first seatbelt payout length threshold and a child restraint seat is detected.

In accordance with another aspect of the present disclosure, the method further includes at least one of suppressing the deployment of at least one restraint when a child restraint seat is present and enabling the deployment of at least one restraint when a large person is present in the motor vehicle seat.

In accordance with another aspect of the present disclosure, the method further includes determining whether an occupant measurement has changed and determining when the occupant measurement is outside an occupant measurement change threshold.

In accordance with another aspect of the present disclosure, the method further includes sensing seat movement and determining a child restraint seat is improperly belted when the seatbelt payout length has not been reduced by a second seatbelt payout length threshold after an automatic locking retractor has been engaged and determining a child restraint seat is properly belted when the seatbelt payout length has been reduced by the second payout length threshold after an automatic locking retractor has been engaged.

In accordance with another aspect of the present disclosure, the first seatbelt payout length threshold is defined by a continuous curve that varies from a first seatbelt payout length to a second seatbelt payout length and from a first seat position to a second seat position, wherein the second seatbelt payout length is greater than the first seatbelt payout length and wherein the second seat position is a different position than the first seat position.

In accordance with another aspect of the present disclosure, the first seatbelt payout length threshold is defined as a continuous curve that varies from a first seatbelt payout length to a second seatbelt payout length and from a first guideloop position to a second guideloop position, wherein the second seatbelt payout length is greater than the first seatbelt payout length and wherein the second guideloop position is different than the first guideloop position.

In accordance with another aspect of the present disclosure, the method further includes determining at least one of a small person is improperly belted, and a small person is unbelted, when the presence of a seatbelt latchplate in the seatbelt buckle is sensed, the presence of a child is sensed, and the seatbelt payout length after the presence of a seatbelt latchplate in the seatbelt buckle is sensed is between a second seatbelt payout length threshold and a third seatbelt payout length threshold.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 11 is a flowchart illustrating a method for determining a seatbelt payout length and adjusting the thresholds after an occupant has moved the vehicle seat, according to an exemplary embodiment;

FIG. 12 is a flowchart illustrating an alternate method for determining a new seatbelt payout length and adjusting the thresholds after an occupant has moved the vehicle seat, according to an exemplary embodiment;

FIG. 13 a chart of the range of acceptable seatbelt payout lengths is shown for a given seat movement in order to confirm that the measured seatbelt payout length is correct, according to an exemplary embodiment;

DETAILED DESCRIPTION

The following description is merely exemplary in nature and is not intended to limit the present disclosure, application, or uses.

Figure 1A:
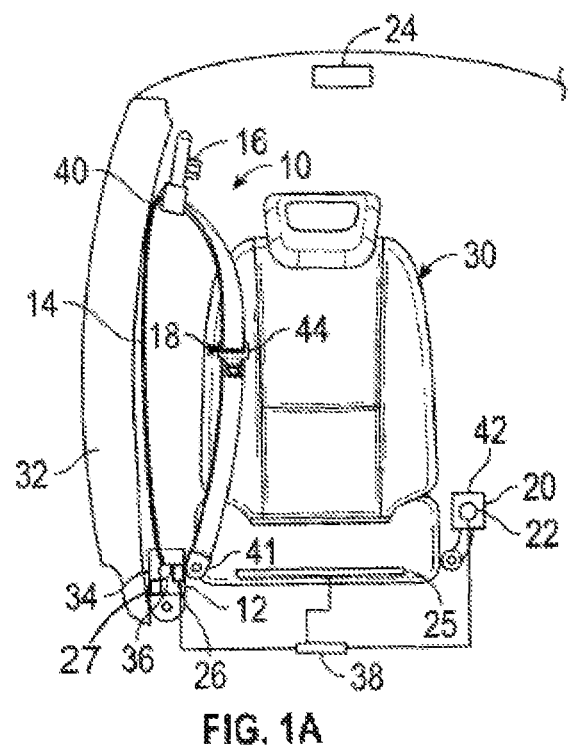
FIG. 1A is a front perspective view of a vehicle seat and a safety restraint system including a retractor mounted proximate the bottom cushion of a vehicle seat, according to an exemplary embodiment.

Referring to FIG. 1A, a safety restraint system 10 for a motor vehicle is illustrated, in accordance with an embodiment of the invention. Safety restraint system 10 includes a seatbelt retractor 12, a seatbelt webbing 14, a guide loop 16, a latchplate 18, a buckle 20, a seatbelt buckle sensor 22, an occupancy sensor 24, a seatbelt webbing payout sensor 26 and an automatic locking retractor (ALR) sensor 27. Seatbelt retractor 12 may include an automatic locking mechanism and, thus, would be referred to as an automatic locking retractor. If seatbelt retractor 12 contains an ALR, seatbelt retractor 12 also includes ALR sensor 27 that senses the engagement and disengagement of the automatic locking mechanism. Seatbelt retractor 12 is fixed to a structural member of the motor vehicle adjacent a vehicle seat 30. For example, seatbelt retractor 12 is bolted to the base of the B-pillar 32 or other structural member of the vehicle. Alternatively, the seat belt retractor 12 may be integrated with and fixedly attached to the base of the seat 30 of the motor vehicle. A frame 34 of seatbelt retractor 12 is configured to rotatably support a spool 36 for controlled rotation in the retractor 12.

A spring (not shown) is operatively attached to the retractor frame 34 at one end of the spring and to the spool 36 at another end of the spring to retract the seatbelt webbing 14 onto the spool 36 and into the retractor 12. The seatbelt webbing 14 is at least partially wound around the spool 36 for storing the seatbelt webbing 14 in the retractor 12 when the safety restraint system 10 is not in use. When the safety restraint system 10 is in use the seatbelt webbing 14 is unwound from the spool 36 and pulled out of the retractor 12 by a vehicle occupant. The seatbelt webbing 14 is typically made of a woven fabric material such as woven nylon or polyester.

The seatbelt webbing payout sensor 26 is in communication with the retractor spool 36. Webbing payout sensor 26 is configured to sense the rotation of the retractor spool 36. A control module or microprocessor control system 38 receives a spool rotation signal from the webbing payout sensor 26 and is configured to determine the length of webbing payout from the rotation of the spool 36 of the retractor 12. The seatbelt webbing payout sensor 26 may also be used to detect the engagement or disengagement of the automatic locking mechanism in the ALR.

Guide loop 16 is fixedly secured to the motor vehicle, generally, towards the top of the B-pillar 32 of the motor vehicle. An optional slot 40 is provided in guide loop 16 that receives and slidably engages the seatbelt webbing 14. The seatbelt webbing 14 generally extends from the retractor 12 up and along the B-pillar 32 and is threaded or routed through guide loop 16 where the seatbelt webbing 14 is directed down toward the base of the seat 30 and is secured at a terminal end 41 to a structural member of the motor vehicle or to the seat 30.

The latchplate 18 has a slot 44 through which the seatbelt webbing is threaded to slidably engage the latchplate 18 with the seatbelt webbing 14. The latchplate 18 is located on the seatbelt webbing 14, generally, between the guide loop 16 and the terminal end 41 of the seatbelt webbing 14. The buckle 20 is configured to releasably capture the latchplate 18. Typically, latchplate 18 is pressed into a slot 42 in buckle 20. After the latchplate 18 is fully inserted into the buckle 20 the latchplate 18 is locked in the buckle 20. A button on the buckle 20 is depressed to release the latchplate 18 from buckle 20.

The seatbelt buckle sensor 22 is provided in the seatbelt buckle 20. Buckle sensor 22 is configured to sense the presence of the latchplate 18. Buckle sensor 22 transmits a control signal to the microprocessor control system 38. The microprocessor control system 38 includes a control algorithm that receives the control signal from the buckle sensor 22 and determines whether the latchplate 18 is present in the seatbelt buckle 20.

One or more occupancy sensors 24, 25 are provided to sense the presence of an occupant in the vehicle seat 30. Occupancy sensor 24 is adjacent the vehicle seat 30. Occupancy sensor 25 is disposed in the vehicle seat 30. Occupancy seat sensor 25 assess occupant presence via different means such as one or more pressure pads, weight pads, load cells, resistive pads and biometric sensors. Occupancy sensor 24 would assess occupant presence via different means, such as via one or more cameras, RADARs, ultra-sonic sensors, infrared sensors, etc. Occupancy sensors 24, 25 are configured to sense the presence of a vehicle occupant in the vehicle seat 30. Each occupancy sensor 24, 25 transmits a control signal to the microprocessor control system 38. The microprocessor control system 38 includes a control algorithm that receives the control signal from the occupancy sensors 24, 25 and determines whether the occupant is present in the vehicle seat 30. Occupancy sensors 24, 25 may detect certain objects as occupants. Occupancy sensors 24, 25 may have one or more detection thresholds to distinguish occupants from objects, detect the size of the occupant and detect the location of the occupant relative to the seating surface of vehicle seat 30.

Figure 1B:
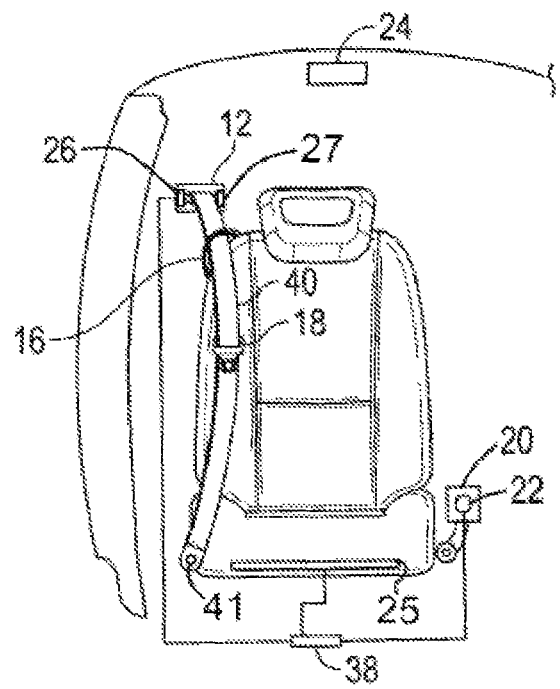
FIG. 1B is a front perspective view of a vehicle seat and a safety restraint system including a shelf mount retractor, according to an exemplary embodiment.
Figure 1C:
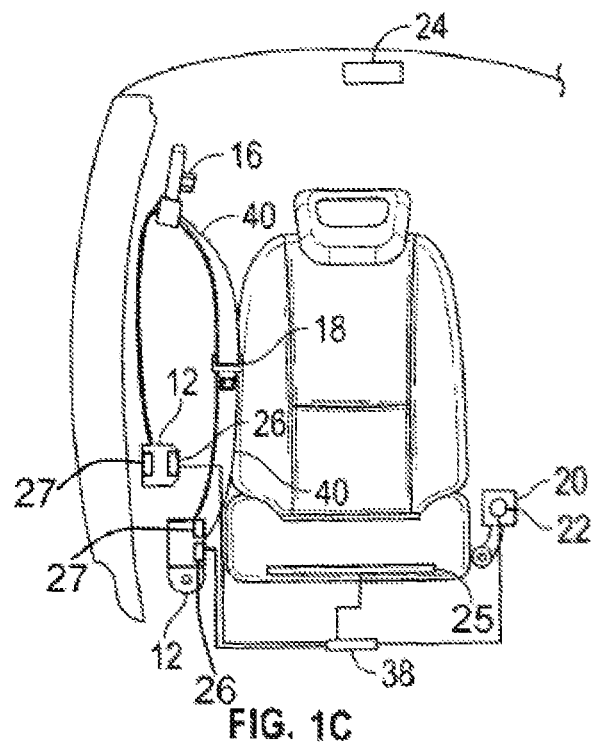
FIG. 1C is a front perspective view of a vehicle seat and a safety restraint system including two retractors mounted proximate the bottom cushion of a vehicle seat, according to an exemplary embodiment.
Figure 1D:
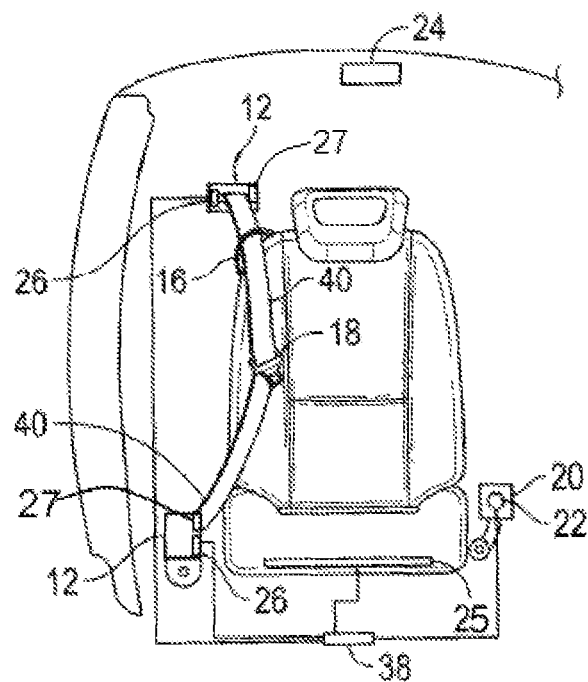
FIG. 1D is a front perspective view of a vehicle seat and a safety restraint system including a shelf mount retractor and a retractor mounted proximate the bottom cushion of a vehicle seat, according to an exemplary embodiment.
Figure 10:
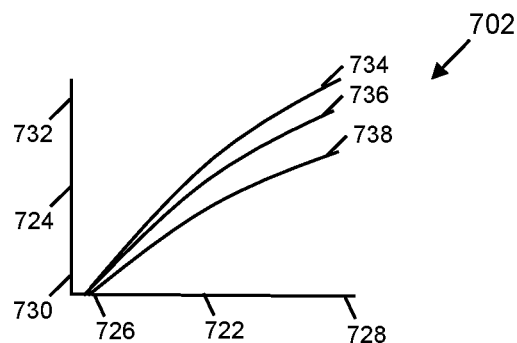

FIGS. 1B, 10 and 1D show alternative seatbelt arrangements. FIG. 1B shows a shelf mount location for the retractor 12 and the guide loop 16 is mounted to or in proximity of the seat 30. FIGS. 10 and 1D show seatbelt systems with two retractors 12. One or both of the retractors 12 have a webbing payout sensor 26. Each webbing payout sensor 26 transmits a control signal to the microprocessor control system 38. The latchplate 18 is sewn into seat belt webbing 14. For embodiments having two webbing payout sensors 26, the method utilizes the two measured payout lengths together. In one embodiment of the present invention, a correction factor is multiplied into one or both payout lengths to produce a more accurate determination by the method of the present disclosure. In another embodiment, systems with two payout sensors 26 the method considers each of the payout lengths individually with different thresholds and runs each routine separately for each sensor input.

The present disclosure includes a plurality of algorithms or methods for determining the seatbelt routing of safety restraint system 10 based on the receipt and processing by microprocessor control system 38 of the control signals from the seatbelt buckle sensor 20, the occupancy sensors 24, 25 the seatbelt payout sensors 26 and the ALR sensor 27. Microprocessor control system 38 includes computer memory to store the plurality of algorithms or methods. Moreover, microprocessor control system 38 includes a processor to execute the computer code that defines the plurality of algorithms or methods. The plurality of algorithms or methods utilize the control signals provided by the seatbelt buckle sensor 20, an occupancy sensor 24, 25, seatbelt payout sensors 26 and the ALR sensor 27 to determine the seatbelt routing, decide whether the determined routing requires a message or a ride action and either issue a message to the vehicle occupant or active a ride action. The plurality of algorithms or methods are described herein below.

Figure 2:
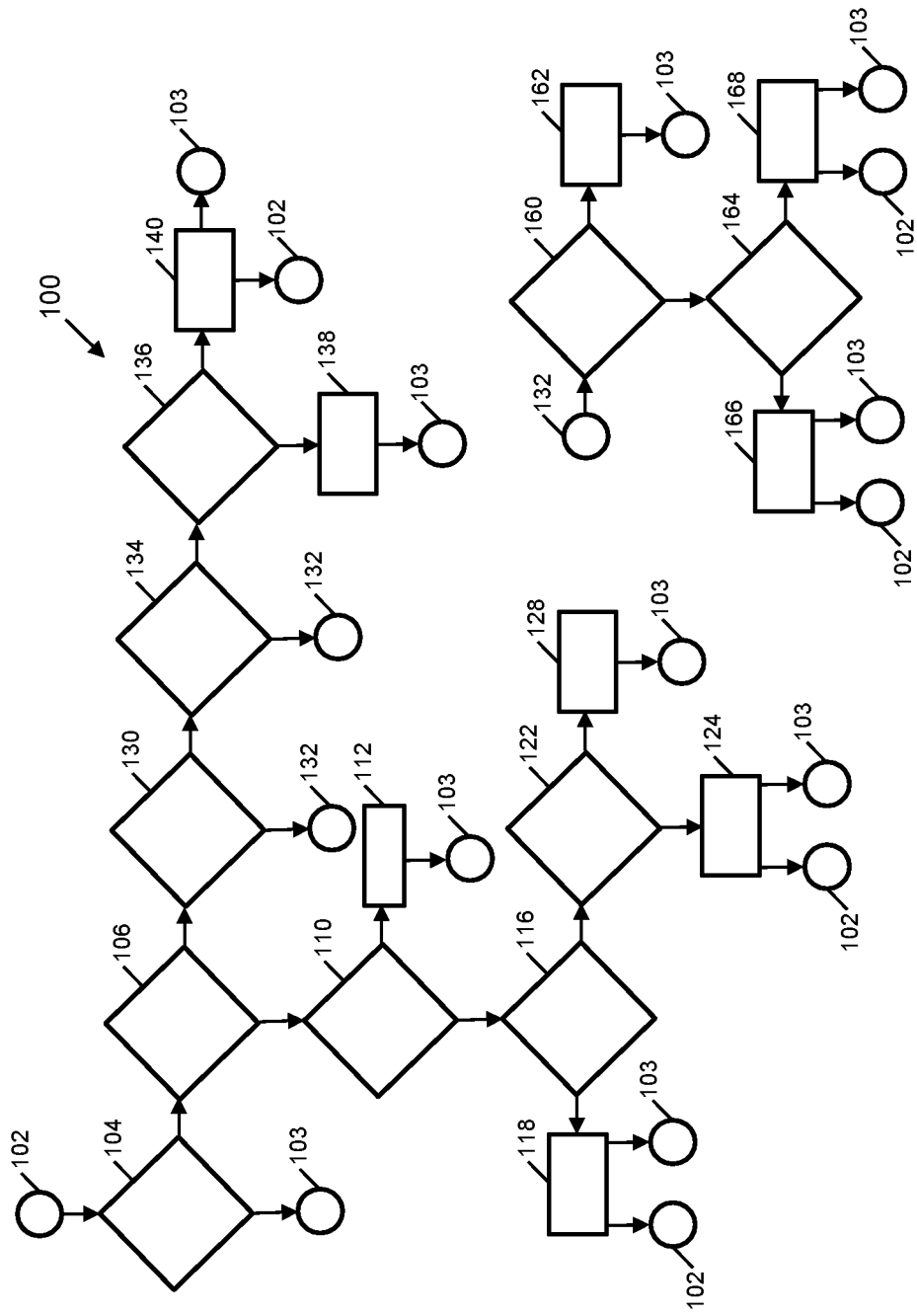
FIG. 2 is a flowchart illustrating a method for determining a flowchart illustrating a method for detecting seatbelt routing for a child, a child restraint seat and an occupant on the seat, according to an exemplary embodiment.

Referring now to FIG. 2, a flowchart illustrating a method 100 for detecting seatbelt routing for a child, a child restraint seat and an occupant on the seat, in accordance with the present invention. More specifically, method 100 is configured to determine a plurality of seatbelt routing conditions such as an improperly belted small occupant, a properly belted child restraint seat a buckled unused seatbelt, a properly belted large occupant, and an improperly belted large occupant for example. The method 100 starts at block 102.

A small occupant is an occupant that has a seatbelt routing length that is less than the routing length when a child restraint seat is installed, for example, a child restraint seat with the shortest routing. Depending on the type of vehicle, vehicle seat, occupant proportions, clothing thickness, and seatbelt environment the small occupant is about the size of a 3-year-old sized, 6-year-old sized, or 10-year-old sized anthropomorphic test device (ATD). A large occupant is an occupant that has a seatbelt routing length that is the same or longer than the routing length when a child restraint seat is installed. The large occupant is one occupant size larger than the small occupant size as defined above. For example, if the small occupant is determined to be the size of a 6-year-old ATD, then the large occupant is determined to be the next larger size ATD, for example, a 10-year-old ATD. A small object is an object that has a seatbelt routing length approximate to the small occupant's seatbelt routing length or shorter when the small object has the seatbelt buckled around the small object. A large object is an object that has seatbelt routing length approximate to the large occupant's seatbelt routing length or longer when the large object has the seatbelt buckled around the large object.

At block 104, a determination is made whether the seatbelt is buckled. If the seatbelt is determined to not be buckled, then the method 100 continues at block 103 to the next routing detection algorithm or method 200. If the seatbelt is determined to be buckled at block 104, then the method 100 continues at block 106 where a determination is made whether a seatbelt payout is equal to or greater than a first payout length threshold. The first payout length threshold may be adjusted based on seat movement or guideloop movement. If at block 106, the seatbelt payout length is not equal to or greater than the first payout length threshold, then the method 100 continues at block 110 where a determination is made whether the seatbelt payout length after buckling has been reduced to a seatbelt payout length between a second seatbelt payout length threshold and a third seatbelt payout length threshold. The second seatbelt payout length threshold and the third seatbelt payout length threshold may be adjusted based on seat movement or guideloop position movement. If at block 110, a determination is made that the seatbelt payout after buckling has been reduced to a seatbelt payout length between the second seatbelt payout length threshold and the third seatbelt payout length threshold then the method 100 continues at block 112 where a message is provided to the vehicle occupants, a ride action is taken, and/or a measured stored static length, restraint/seat status and occupant/child restraint seat (CRS) classification/posture is stored.

Stored static length is determined when the seatbelt is buckled. For example stored static length is: a) the actual payout length when the seatbelt is buckled, b) the average payout length over a predetermined time window starting at the time the seatbelt is buckled, c) the minimum payout length over a predetermined time window starting at the time of seatbelt buckling (to account for an occupant leaning forward or twisting while or right after buckling), d) the average or minimum payout length between a predetermined time window that starts and stops at predetermined times after buckling, e) the minimum payout length before the seatbelt payout increases (or increases beyond a predetermined amount), and alternatively limited to within a predetermined time window after buckling, f) if the ALR function in the seatbelt retractor has activated, then the stored static length is the minimum payout length within a predetermined time window after ALR activation, and g) if a buckled occupant is present in the vehicle seat, any of the above stored static length determination methods may be used to determine stored static length, however, the stored static length is determined after the buckled occupant has retracted the seatbelt to remove slack in the seatbelt webbing.

For the above enumerated examples, the window for determining the stored static length is alternatively terminated once the rate of seatbelt webbing retraction exceeds a predetermined rate threshold. The message provided to the vehicle occupants are visual, audible, haptic, or a combination thereof. For example, the messages and ride actions that may be taken are: a) allowing the ride to proceed, b) suppressing selected restraints from deploying, c) warning the occupants that a buckled unused seatbelt has been detected, d) instructing any occupant to unbuckle the seatbelt, e) preventing the ride from starting, f) taking the vehicle and parking the vehicle in a local low risk location, g) contacting the home office that oversees the vehicle service to reset the system, view the interior environment to assess the situation or dialogue with the occupant and e) turning on a message icon, making a dinging sound, playing an audible message, vibrating a seat or some combination thereof. After block 112 the method continues to block 103.

The restraint/seat status and occupant/child restraint seat (CRS) classification/posture classifications to be stored, for example, are: a) large occupant who is of the size to wear the vehicle seatbelt system, b) small occupant who is of the size to wear the vehicle seatbelt system, c) small or smaller occupant who is in a booster seat whose configuration requires usage of the vehicle seatbelt system to restrain the child, d) small or smaller occupant who is in a child restraint seat whose configuration requires usage of the child restraint seatbelt system to restrain the child, e) empty child restraint seat, f) an object, and g) an empty vehicle seat. Occupancy sensors 24, 25 may be capable of distinguishing a forward-facing child restraint from a rearward facing child restraint. Moreover, occupancy sensors 24, 25 may be able to detect individual classifications of occupants or specific groups of classifications of occupants.

If at block 110, a determination is made whether the seatbelt payout after buckling has been not reduced to a seatbelt payout length between the second seatbelt payout length threshold and the third seatbelt payout length threshold then the method 100 continues at block 116 where a determination is made whether the seatbelt payout is less than the third seatbelt payout length threshold. If at block 116, a determination is made that the seatbelt payout is less than the third seatbelt payout length threshold, then the method 100 continues at block 118 where a message is provided to the vehicle occupants, a ride action is taken, and/or a measured stored static length, restraint/seat status and occupant/CRS classification/posture is stored. The message provided to the vehicle occupants are visual, audible, haptic, or a combination thereof. For example, the messages and ride actions that may be taken are: a) warning the occupant that the latchplate is buckled in the incorrect buckle, b) warning the occupant that a fake latchplate is buckled in the buckle, c) suppressing selected restraints, d) instructing the occupant to unbuckle and re-buckle, e) instructing the adjacent occupant to buckle into the correct buckle, f) preventing the ride from starting, g) taking the vehicle and parking the vehicle in a local low risk location, h) contacting the home office that oversees the vehicle service to reset the system, view the interior environment to assess the situation or dialogue with the occupant and i) turning on a message icon, making a dinging sound, playing an audible message, vibrating a seat or some combination thereof. Parameters can be stored such as the occupant classification, the stored static length of the seatbelt, the occupant posture, the seatbelt buckle status, the seat location, the guide loop location, and any decision to enable or suppress deployment of specific restraints. After block 118 the method returns to block 102. Alternately, after block 118 in another embodiment of the present disclosure the method returns to block 103.

If at block 116 the seatbelt payout is not less than the third seatbelt payout length threshold, then the method 100 continues at block 122 where a determination is made whether an ALR has been engaged after buckling. If a determination has been made that the ALR has been engaged after buckling then the method 100 continues at block 124 where a message is provided to the vehicle occupants, a ride action is taken, and/or a measured stored static length, restraint/seat status and occupant/CRS classification/posture is stored. The message provided to the vehicle occupants are visual, audible, haptic, or a combination thereof. For example, the messages and ride actions that may be taken are: a) suppressing selected restraints, b) warning that the automatic locking retractor (ALR) function has been set for a small sized occupant, c) instructing the occupant to unbuckle and re-buckle, d) warning that a small occupant is not using a child restraint seat, e) preventing the ride from starting, f) taking the vehicle and parking the vehicle in a local low risk location, and g) remotely resetting the system, h) viewing the interior environment to assess the situation or dialogue with the occupant, i) enabling a ride because a properly restrained object or child restraint is present, and j) turning on a message icon, making an audible sound, playing an audible message, vibrating a seat or some combination thereof. Parameters can be stored such as the occupant classification, the stored static length of the seatbelt, the occupant posture, the seatbelt buckle status, the seat location, the guide loop location, and any decision to enable or suppress deployment of specific restraints. After block 124 the method returns to block 102. Alternately, after block 124 in another embodiment of the present disclosure the method returns to block 103.

If at block 122 a determination has been made that the ALR has not been engaged after buckling then the method 100 continues at block 128 where a message is provided to the vehicle occupants, a ride action is taken and/or a measured stored static length, restraint/seat status and occupant/CRS classification/posture is stored. For example, ride actions that may be taken are: a) enabling a ride because a properly restrained small occupant is present, b) messaging the occupant to inform them that they are properly restrained, c) suppressing the deployment of selected restraints, d) warning the occupants that an improperly restrained object or child restraint seat is present, e) preventing the ride from starting, f) taking the vehicle and parking the vehicle in a local low risk location, g) remotely resetting the system, h) viewing the interior environment to assess the situation or dialogue with the occupant, and i) turning on a message icon, making an audible sound, playing an audible message, vibrating a seat or some combination thereof. Parameters can be stored such as the occupant classification, the stored static length of the seatbelt, the occupant posture, the seatbelt buckle status, the seat location, the guide loop location, and any decision to enable or suppress deployment of specific restraints. After block 128 the method continues to block 103.

However, if in block 106, the seatbelt payout is equal to or greater than the first seatbelt payout length threshold, then the method 100 continues at block 130 where a determination is made whether an occupant is present in the seat at the time of buckling. If at block 130, a determination is made that an occupant is not present in the seat at the time of buckling then the method 200 continues at block 132. If at block 130, a determination is made that an occupant is present in the seat at the time of buckling then the method 100 continues at block 134. At block 134, a determination is made whether an occupant is not present in the vehicle seat for more than a predetermined time within a predetermined time window. If at block 134, a determination is made that an occupant is not present in the vehicle seat for more than a predetermined time within a predetermined time window then the method continues to block 132. However, if at block 134, a determination is made that an occupant is present in the vehicle seat for more than a predetermined time within a predetermined time window then the method continues to block 136 where a determination is made whether the ALR has been engaged after buckling. If at block 136 a determination has been made that the ALR has been engaged after buckling then the method 100 continues at block 138 where a ride action is taken and/or a measured stored static length, restraint/seat status and occupant/CRS classification/posture is stored. For example, ride actions that may be taken are: a) enabling a ride because a properly restrained large occupant is present, b) messaging the occupant to inform them that they are properly restrained, c) enabling the deployment of selected restraints, d) warning the occupants that an improperly restrained object or possibly child restraint seat is present, e) preventing the ride from starting, f) taking the vehicle and parking the vehicle in a local low risk location, g) remotely resetting the system, h) viewing the interior environment to assess the situation or dialogue with the occupant, and i) turning on a message icon, making an audible sound, playing an audible message, vibrating a seat or some combination thereof. Parameters can be stored such as the occupant classification, the stored static length of the seatbelt, the occupant posture, the seatbelt buckle status, the seat location, the guide loop location, and any decision to enable or suppress deployment of specific restraints. After block 138 the method continues to block 103.

However, if at block 136 a determination has been made that the ALR has been engaged after buckling then the method 100 continues at block 140 where a message is provided to the vehicle occupants, a ride action is taken, and/or a measured stored static length, restraint/seat status and occupant/CRS classification/posture is stored. The message provided to the vehicle occupants are visual, audible, haptic, or a combination thereof. For example, the messages and ride actions that may be taken are: a) warning that the ALR has been set for an occupant, b) enabling selected restraints, c) warning that the automatic locking retractor (ALR) function has been set for a large sized occupant, d) instructing the occupant to unbuckle and re-buckle, e) preventing the ride from starting, f) taking the vehicle and parking the vehicle in a local low risk location, and g) remotely resetting the system, h) viewing the interior environment to assess the situation or dialogue with the occupant, i) enabling a ride because a properly object or possibly child restraint is present, and j) turning on a message icon, making an audible sound, playing an audible message, vibrating a seat or some combination thereof. Parameters can be stored such as the occupant classification, the stored static length of the seatbelt, the occupant posture, the seatbelt buckle status, the seat location, the guide loop location, and any decision to enable or suppress deployment of specific restraints. After block 140 the method returns to block 102. Alternately, after block 140 in another embodiment of the present disclosure the method returns to block 103.

From block 132 the method continues to block 160 where a determination is made whether the ALR has been engaged after buckling. If the determination is made that the ALR has been engaged after buckling, then the method 100 continues at block 162 where a ride action is taken and/or a measured stored static length, restraint/seat status and occupant/CRS classification/posture is stored. For example, ride actions that may be taken are: a) enabling a ride because a properly restrained child restraint seat is present, b) messaging the occupants to inform them that the child restraint seat is properly restrained and optionally reminding them to properly buckle the child into the child restraint seatbelt system, c) suppressing the deployment of selected restraints, and d) turning on a message icon, making an audible sound, playing an audible message, vibrating a seat or some combination thereof. Parameters can be stored such as the occupant classification, the stored static length of the seatbelt, the occupant posture, the seatbelt buckle status, the seat location, the guide loop location, and any decision to enable or suppress deployment of specific restraints. After block 162 the method proceeds to block 103.

However, if at block 160, a determination is made that the ALR has not been engaged after buckling then the method 100 continues at block 164. At block 164, a determination is made whether after buckling is the seatbelt payout increased by a fourth seatbelt payout length threshold to a fifth seatbelt payout length threshold within a predetermined time period. If at block 164, a determination is made that after buckling the seatbelt payout has not increased by the fourth seatbelt payout length threshold to the fifth seatbelt payout length threshold within a predetermined time period then the method 100 continues to block 166. At block 166, a message is provided to the vehicle occupants, a ride action is taken, and/or a measured stored static length, restraint/seat status and occupant/CRS classification/posture is stored. The message provided to the vehicle occupants are visual, audible, haptic, or a combination thereof. For example, the messages and ride actions that may be taken are: a) warning that the child restraint seat hasn't been locked down to the seatbelt via an ALR or a child restraint seat lockoff device, b) suppressing selected restraints, c) instructing that the child restraint be reinstalled, d) preventing the ride from starting, e) taking the vehicle and parking the vehicle in a local low risk location, f) remotely resetting the system, g) viewing the interior environment to assess the situation or dialogue with the occupant and h) turning on a message icon, making an audible sound, playing an audible message, vibrating a seat or some combination thereof. Parameters can be stored such as the occupant classification, the stored static length of the seatbelt, the CRS classification, the occupant posture, the seatbelt buckle status, the seat location, the guide loop location, and any decision to enable or suppress deployment of specific restraints. After block 166 the method returns to block 102. Alternately, after block 166 in another embodiment of the present disclosure the method returns to block 103.

However, if at block 164, a determination is made that after buckling the seatbelt payout has increased by the fourth seatbelt payout length threshold to the fifth seatbelt payout length threshold within a predetermined time period then the method 100 continues to block 168. At block 168, a ride action is taken and/or a measured stored static length, restraint/seat status and occupant/CRS classification/posture is stored. For example, ride actions that may be taken are: a) enabling a ride because a properly restrained child restraint seat is present, b) messaging the occupants to inform them that the child restraint seat is properly restrained and optionally reminding them to properly buckle the child into the child restraint seatbelt system, c) suppressing the deployment of selected restraints, and d) turning on a message icon, making an audible sound, playing an audible message, vibrating a seat or some combination thereof. Parameters can be stored such as the occupant classification, the stored static length of the seatbelt, the occupant posture, the seatbelt buckle status, the seat location, the guide loop location, and any decision to enable or suppress deployment of specific restraints. After block 168 the method proceeds to block 103.

Figure 3:
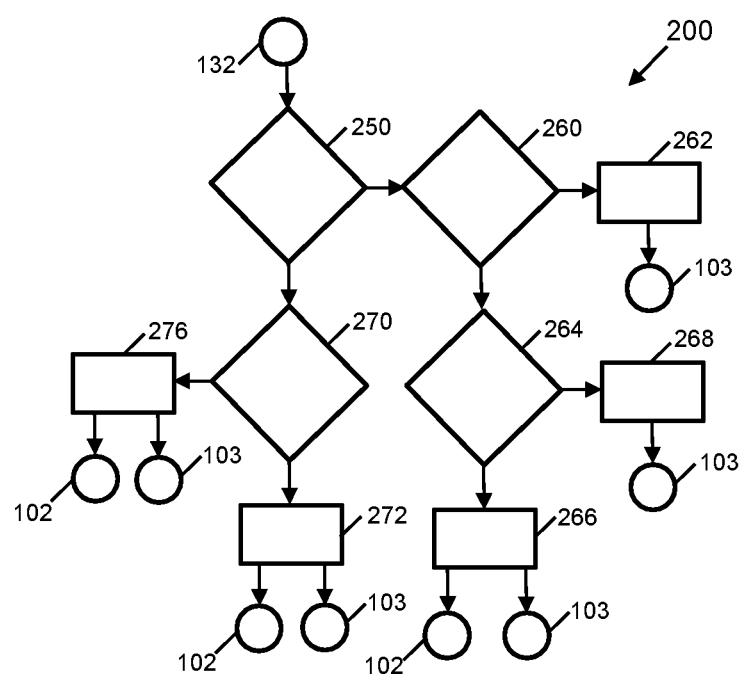
FIG. 3 is a flowchart illustrating a method for determining whether a child restraint seat is present and proper seatbelt routing of same, according to an exemplary embodiment.

Referring now to FIG. 3, a flowchart illustrating a method 200 for detecting seatbelt routing, in accordance with the present invention. The method 200 starts at block 132 of method 100 and continues to block 250 where a determination is made whether a child restraint seat is present. If a child restraint seat is present, then the method continues to block to block 260 where a determination is made whether the ALR has been engaged after buckling. If the determination is made that the ALR has been engaged after buckling, then the method 200 continues at block 262 where a ride action is taken and/or a measured stored static length, restraint/seat status and occupant/CRS classification/posture is stored. For example, ride actions that may be taken are: a) enabling a ride because a properly restrained child restraint seat is present, b) messaging the occupants to inform them that the child restraint seat is properly restrained and optionally reminding them to properly buckle the child into the child restraint seatbelt system, c) suppressing the deployment of selected restraints, and d) turning on a message icon, making an audible sound, playing an audible message, vibrating a seat or some combination thereof. Parameters can be stored such as the occupant classification, the stored static length of the seatbelt, the occupant posture, the seatbelt buckle status, the seat location, the guide loop location, and any decision to enable or suppress deployment of specific restraints. After block 262 the method continues to block 103.

However, if at block 260, a determination is made that the ALR has not been engaged after buckling then the method 200 continues at block 264. At block 264, a determination is made whether after buckling is the seatbelt payout length increased to a sixth seatbelt payout length threshold within a predetermined time period. If at block 264, a determination is made that after buckling the seatbelt payout length has not increased to the sixth seatbelt payout length threshold within a predetermined time period then the method 200 continues to block 266. At block 266, a message is provided to the vehicle occupants, a ride action is taken, and/or a measured stored static length, restraint/seat status and occupant/CRS classification/posture is stored. The message provided to the vehicle occupants are visual, audible, haptic, or a combination thereof. For example, the messages and ride actions that may be taken are: a) warning that the child restraint seat hasn't been locked down to the seatbelt via an ALR or a child restraint seat lockoff device, b) suppressing selected restraints, c) instructing that the child restraint be reinstalled, d) preventing the ride from starting, e) taking the vehicle and parking the vehicle in a local low risk location, f) remotely resetting the system, g) viewing the interior environment to assess the situation or dialogue with the occupant and h) turning on a message icon, making an audible sound, playing an audible message, vibrating a seat or some combination thereof. Parameters can be stored such as the occupant classification, the stored static length of the seatbelt, the CRS classification, the occupant posture, the seatbelt buckle status, the seat location, the guide loop location, and any decision to enable or suppress deployment of specific restraints. After block 266 the method returns to block 102. Alternately, after block 266 in another embodiment of the present disclosure the method returns to block 103.

However, if at block 264, a determination is made that after buckling the seatbelt payout has increased to the sixth seatbelt payout length threshold within a predetermined time period then the method 200 continues to block 268. At block 268, a ride action is taken and/or a measured stored static length, restraint/seat status and occupant/CRS classification/posture is stored. For example, ride actions that may be taken are: a) enabling a ride because a properly restrained child restraint seat is present, b) messaging the occupants to inform them that the child restraint seat is properly restrained and optionally reminding them to properly buckle the child into the child restraint seatbelt system, c) suppressing the deployment of selected restraints, and d) turning on a message icon, making an audible sound, playing an audible message, vibrating a seat or some combination thereof. Parameters can be stored such as the occupant classification, the stored static length of the seatbelt, the occupant posture, the seatbelt buckle status, the seat location, the guide loop location, and any decision to enable or suppress deployment of specific restraints. After block 268 the method continues to block 103.

If at block 250, a child restraint seat is not present, then the method continues to block 270 where a determination is made whether the ALR has been engaged after buckling. If the determination is made that the ALR has been engaged after buckling, then the method 200 continues at block 272 where a ride action is taken and/or a measured stored static length, restraint/seat status and occupant/CRS classification/posture is stored. For example, ride actions that may be taken are: a) enabling a ride because a properly restrained child restraint seat is present, b) messaging the occupants to inform them that the child restraint seat is properly restrained and optionally reminding them to properly buckle the child into the child restraint seatbelt system, c) suppressing the deployment of selected restraints, and d) turning on a message icon, making an audible sound, playing an audible message, vibrating a seat or some combination thereof. Parameters can be stored such as the occupant classification, the stored static length of the seatbelt, the occupant posture, the seatbelt buckle status, the seat location, the guide loop location, and any decision to enable or suppress deployment of specific restraints. After block 272 the method continues to block 103.

However, if at block 270, a determination is made that the ALR has not been engaged after buckling then the method 200 continues to block 276. At block 276, a message is provided to the vehicle occupants, a ride action is taken, and/or a measured stored static length, restraint/seat status and occupant/CRS classification/posture is stored. The message provided to the vehicle occupants are visual, audible, haptic, or a combination thereof. For example, the messages and ride actions that may be taken are: a) warning that the child restraint seat hasn't been locked down to the seatbelt via an ALR or a child restraint seat lockoff device, b) suppressing selected restraints, c) instructing that the child restraint be reinstalled, d) preventing the ride from starting, e) taking the vehicle and parking the vehicle in a local low risk location, f) remotely resetting the system, g) viewing the interior environment to assess the situation or dialogue with the occupant and h) turning on a message icon, making an audible sound, playing an audible message, vibrating a seat or some combination thereof. Parameters can be stored such as the occupant classification, the stored static length of the seatbelt, the CRS classification, the occupant posture, the seatbelt buckle status, the seat location, the guide loop location, and any decision to enable or suppress deployment of specific restraints. After block 276 the method returns to block 102. Alternately, after block 276 in another embodiment of the present disclosure the method returns to block 103.

Figure 4:
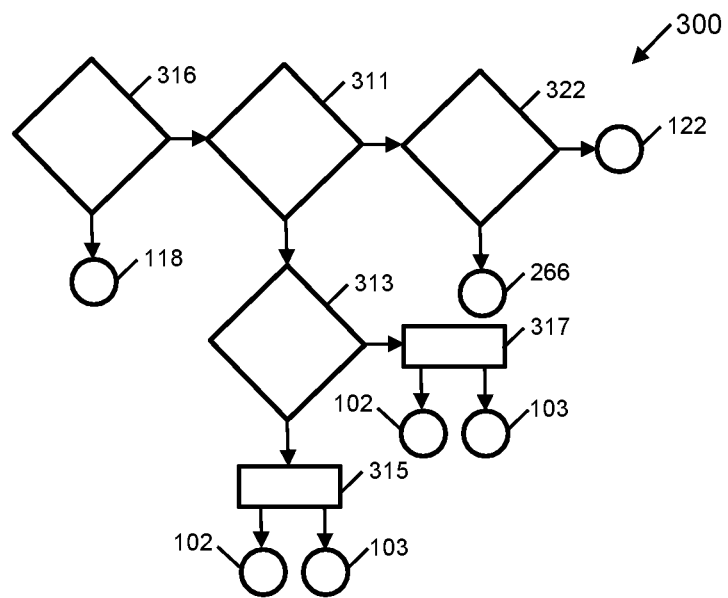
FIG. 4 is a flowchart illustrating a method for detecting when a person is too small to be buckled into a seatbelt without a child restraint seat, according to an exemplary embodiment.

Referring now to FIG. 4, a flowchart illustrating a method 300 for detecting when a person is too small to be buckled into a seatbelt without a child restraint seat. The method 300 starts at block 116 of method 100 which is referenced as block 316 of method 300. If at block 316, the seatbelt payout length is not less than the third seatbelt payout length threshold, then the method 300 continues at block 311 where a determination is made whether the seatbelt payout is less than a seventh seatbelt payout length threshold. If at block 311, the seatbelt payout is less than the seventh seatbelt payout length threshold, then the method 300 continues at block 313 where a determination is made whether an ALR has been engaged after buckling. The seventh seatbelt payout length threshold is the threshold to detect if the seatbelt payout length indicates that a very small occupant is present and who should be in a child restraint seat. If a determination has been made that the ALR has been engaged after buckling then the method 300 continues at block 315 where a message is provided to the vehicle occupants, a ride action is taken, and/or a measured stored static length, restraint/seat status and occupant/CRS classification/posture is stored. The message provided to the vehicle occupants are visual, audible, haptic, or a combination thereof. For example, the messages and ride actions that may be taken are: a) suppressing selected restraints, b) warning that a small sized occupant should be using a child restraint seat, c) instructing the occupant to use a properly attached child restraint seat, d) warning that an ALR has been set, e) preventing the ride from starting, f) taking the vehicle and parking the vehicle in a local low risk location, g) remotely resetting the system, h) viewing the interior environment to assess the situation or dialogue with the occupant, and i) turning on a message icon, making an audible sound, playing an audible message, vibrating a seat or some combination thereof. Parameters can be stored such as the occupant classification, the stored static length of the seatbelt, the occupant posture, the seatbelt buckle status, the seat location, the guide loop location, and any decision to enable or suppress deployment of specific restraints. After block 315 the method returns to block 102. Alternately, after block 315 in another embodiment of the present disclosure the method returns to block 103.

If at block 313 a determination has been made that the ALR has not been engaged after buckling then the method 300 continues at block 317 where a message is provided to the vehicle occupants, a ride action is taken, and/or a measured stored static length, restraint/seat status and occupant/CRS classification/posture is stored. The message provided to the vehicle occupants are visual, audible, haptic, or a combination thereof. For example, the messages and ride actions that may be taken are: a) suppressing selected restraints, b) warning that a small sized occupant should be using a child restraint seat, c) instructing the occupant to use a properly attached child restraint seat, d) preventing the ride from starting, e) taking the vehicle and parking the vehicle in a local low risk location, f) remotely resetting the system, g) viewing the interior environment to assess the situation or dialogue with the occupant, and h) turning on a message icon, making an audible sound, playing an audible message, vibrating a seat or some combination thereof. Parameters can be stored such as the occupant classification, the stored static length of the seatbelt, the occupant posture, the seatbelt buckle status, the seat location, the guide loop location, and any decision to enable or suppress deployment of specific restraints. After block 317 the method returns to block 102. Alternately, after block 317 in another embodiment of the present disclosure the method returns to block 103. Alternatively, block 313 may be skipped so that method 300 goes from block 311 to block 317.

If at block 311, the seatbelt payout is not less than the seventh seatbelt payout length threshold, indicating that a small occupant of proper size to be wearing a seatbelt is present, then the method 300 returns to block 322 and proceeds as defined by block 122 of method 100.

Figure 5:
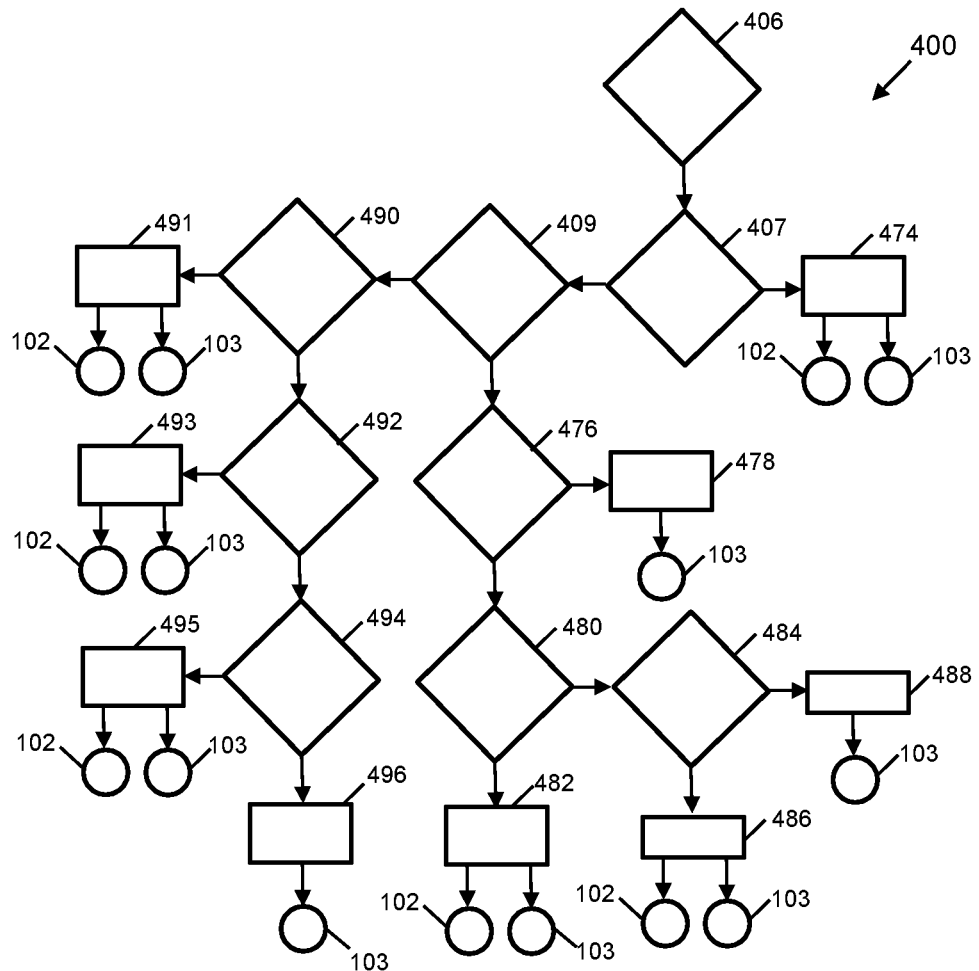
FIG. 5 is a flowchart illustrating a method for detecting an improperly restrained child restraint seat, a buckled unused seatbelt, according to an exemplary embodiment.

Referring now to FIG. 5, a flowchart illustrating a method 400 for detecting an improperly restrained child restraint seat, a buckled unused seatbelt, a seatbelt for an adjacent seating position is buckled into this seating position's buckle, a fake latch plate, and a restrained object, in accordance with the present invention. The method 400 starts at block 106 of method 100, herein referred to as block 406. At block 406, a determination is made whether a seatbelt payout length is greater or equal to the first seatbelt payout length threshold. If at block 406 a determination is made that the seatbelt payout length is not greater or equal to the first seatbelt payout length threshold, then the method 400 continues to block 407. At block 407 a determination is made whether a child restraint seat is present in the seat. If at block 407 a determination is made that a child restraint seat is present in the vehicle seat then the method 400 continues at block 474. At block 474 a message is provided to the vehicle occupants, a ride action is taken, and/or a measured stored static length, restraint/seat status and occupant/CRS classification/posture is stored. The message provided to the vehicle occupants are visual, audible, haptic, or a combination thereof. For example, the messages and ride actions that may be taken are: a) warning that the child restraint seat hasn't been properly installed, b) suppressing selected restraints, c) instructing that the child restraint be installed properly, d) preventing the ride from starting, e) taking the vehicle and parking the vehicle in a local low risk location, f) remotely resetting the system, g) viewing the interior environment to assess the situation or dialogue with the occupant and h) turning on a message icon, making an audible sound, playing an audible message, vibrating a seat or some combination thereof. Parameters can be stored such as the occupant classification, the stored static length of the seatbelt, the occupant posture, the seatbelt buckle status, the seat location, the guide loop location, and any decision to enable or suppress deployment of specific restraints. After block 474 the method returns to block 102. Alternately, after block 474 in another embodiment of the present disclosure the method returns to block 103.

In yet another alternative, if at block 406, a determination is made that the seatbelt payout length is not greater or equal to the first seatbelt payout length threshold, then the method 400 can skip block 407 and can continue at block 409.

However, if at block 407 a determination is made that a child restraint seat is not present in the vehicle seat then the method 400 continues to block 409. At block 409, a determination is made whether a child is present in the vehicle seat.

If at block 409 a child is determined to not be present in the vehicle seat, then the method 400 continues at block 476 where a determination is made whether the seatbelt payout after buckling has been reduced to a seatbelt payout length between an eighth seatbelt payout length threshold and a ninth seatbelt payout length threshold. If at block 476 a determination is made that the seatbelt payout after buckling has been reduced to the seatbelt payout length between the eighth seatbelt payout length threshold and the ninth seatbelt payout length threshold, a buckled unused seatbelt may be present that may or may not be a lazy seatbelt that doesn't fully retract, then the method 400 continues at block 478. At block 478 a ride action is taken, and/or a measured stored static length, restraint/seat status and occupant/CRS classification/posture is stored. For example, the messages and ride actions that may be taken are: a) allowing the ride to proceed, b) suppressing selected restraints from deploying, c) warning the occupants that a buckled unused seatbelt has been detected, d) instructing any occupant to unbuckle the seatbelt, e) preventing the ride from starting, f) taking the vehicle and parking the vehicle in a local low risk location, g) contacting the home office that oversees the vehicle service to reset the system, view the interior environment to assess the situation or dialogue with the occupant and e) turning on a message icon, making a dinging sound, playing an audible message, vibrating a seat or some combination thereof. Parameters can be stored such as the occupant classification, the stored static length of the seatbelt, the occupant posture, the seatbelt buckle status, the seat location, the guide loop location, and any decision to enable or suppress deployment of specific restraints. After block 478 the method continues to block 103.

However, if at block 476 a determination is made that the seatbelt payout after buckling has not been reduced to a seatbelt payout length between the eighth seatbelt payout length threshold and the ninth seatbelt payout length threshold then the method 400 continues at block 480. At block 480, a determination is made whether the seatbelt payout is less than the ninth seatbelt payout length threshold. If at block 480 a determination is made that the seatbelt payout is less than the ninth seatbelt payout length threshold, a fake latch plate may be present or an adjacent seatbelt latch plate could be present, then the method 400 continues at block 482 where a message is provided to the vehicle occupants, a ride action is taken, and/or a measured stored static length, restraint/seat status and occupant/CRS classification/posture is stored. The message provided to the vehicle occupants are visual, audible, haptic, or a combination thereof. For example, the messages and ride actions that may be taken are: a) warning the occupant that the latchplate is buckled in to the incorrect buckle, b) warning the occupant that a fake latchplate is buckled into the buckle, c) suppressing selected restraints, d) instructing the occupant to unbuckle and re-buckle, e) instructing the adjacent occupant to buckle into the correct buckle, f) preventing the ride from starting, g) taking the vehicle and parking the vehicle in a local low risk location, h) contacting the home office that oversees the vehicle service to reset the system, view the interior environment to assess the situation or dialogue with the occupant and i) turning on a message icon, making a dinging sound, playing an audible message, vibrating a seat or some combination thereof. Parameters can be stored such as the occupant classification, the stored static length of the seatbelt, the occupant posture, the seatbelt buckle status, the seat location, the guide loop location, and any decision to enable or suppress deployment of specific restraints. After block 482 the method returns to block 102. Alternately, after block 482 in another embodiment of the present disclosure the method returns to block 103.

However, if at block 480 a determination is made that the seatbelt payout is not less than the ninth seatbelt payout length threshold then method 400 proceeds to block 484 where a determination is made whether an ALR has been engaged after buckling. If at block 484 a determination has been made that the ALR has been engaged after buckling, indicating that a belted object is present, then the method 400 continues at block 486 where a message is provided to the vehicle occupants, a ride action is taken, and/or a measured stored static length, restraint/seat status and occupant/CRS classification/posture is stored. For example, ride actions that may be taken are: a) enabling a ride because a properly restrained small occupant is present, b) messaging the occupant to inform them that they are properly restrained, c) suppressing the deployment of selected restraints, d) remotely resetting the system, e) viewing the interior environment to assess the situation or dialogue with the occupant, and f) turning on a message icon, making an audible sound, playing an audible message, vibrating a seat or some combination thereof. Parameters can be stored such as the occupant classification, the stored static length of the seatbelt, the occupant posture, the seatbelt buckle status, the seat location, the guide loop location, and any decision to enable or suppress deployment of specific restraints. After block 482 the method continues to block 103.

If at block 484 a determination has been made that the ALR has not been engaged after buckling, indicating an improperly belted object, then the method 400 continues at block 486 where a message is provided to the vehicle occupants, a ride action is taken, and/or a measured stored static length, restraint/seat status and occupant/CRS classification/posture is stored. The message provided to the vehicle occupants are visual, audible, haptic, or a combination thereof. For example, ride actions that may be taken are: a) warning the occupants that an improperly restrained object or child restraint seat is present, b) preventing the ride from starting, c) taking the vehicle and parking the vehicle in a local low risk location, d) remotely resetting the system, e) viewing the interior environment to assess the situation or dialogue with the occupant, and f) turning on a message icon, making an audible sound, playing an audible message, vibrating a seat or some combination thereof. Parameters can be stored such as the occupant classification, the stored static length of the seatbelt, the occupant posture, the seatbelt buckle status, the seat location, the guide loop location, and any decision to enable or suppress deployment of specific restraints. After block 486 the method returns to block 102. Alternately, after block 486 in another embodiment of the present disclosure the method returns to block 103.

If at block 484 a determination has been made that the ALR has been engaged after buckling, indicating a properly belted object, then the method 400 continues at block 488 where a message is provided to the vehicle occupants, a ride action is taken, and/or a measured stored static length, restraint/seat status and occupant/CRS classification/posture is stored. The message provided to the vehicle occupants are visual, audible, haptic, or a combination thereof. For example, ride actions that may be taken are: a) messaging the occupants that a properly restrained object or child restraint seat is present, b) enabling the ride from starting, c) remotely resetting the system, d) viewing the interior environment to assess the situation or dialogue with the occupant, and e) turning on a message icon, making an audible sound, playing an audible message, vibrating a seat or some combination thereof. Parameters can be stored such as the occupant classification, the stored static length of the seatbelt, the occupant posture, the seatbelt buckle status, the seat location, the guide loop location, and any decision to enable or suppress deployment of specific restraints. After block 488 the method returns to block 103.

If at block 409 a determination is made that a child is present in the vehicle seat, then the method continues at block 490 where a determination is made whether the seatbelt payout length after buckling has been reduced to a seatbelt payout length between a tenth seatbelt payout length threshold and a eleventh seatbelt payout length threshold. The tenth seatbelt payout length threshold and the eleventh seatbelt payout length threshold may be adjusted based on seat movement or guideloop position movement. If at block 490, a determination is made that the seatbelt payout length after buckling has been reduced to a seatbelt payout length between the tenth seatbelt payout length threshold and the eleventh seatbelt payout length threshold then the method 400 continues at block 491 where a message is provided to the vehicle occupants, a ride action is taken, and/or a measured stored static length, restraint/seat status and occupant/CRS classification/posture is stored. The message provided to the vehicle occupants are visual, audible, haptic, or a combination thereof. For example, the messages and ride actions that may be taken are: a) suppressing selected restraints, b) warning that an occupant is not wearing the seatbelt or is only wearing the seatbelt across a portion of the body, c) instructing the occupant to unbuckle and re-buckle, d) warning that a small occupant is not using a child restraint seat, e) preventing the ride from starting, f) taking the vehicle and parking the vehicle in a local low risk location, and g) remotely resetting the system, h) viewing the interior environment to assess the situation or dialogue with the occupant, and i) turning on a message icon, making an audible sound, playing an audible message, vibrating a seat or some combination thereof. Parameters can be stored such as the occupant classification, the stored static length of the seatbelt, the occupant posture, the seatbelt buckle status, the seat location, the guide loop location, and any decision to enable or suppress deployment of specific restraints. After block 491 the method returns to block 102. Alternately, after block 491 in another embodiment of the present disclosure the method returns to block 103.

If at block 490, a determination is made that the seatbelt payout after buckling has not been reduced to a seatbelt payout length between the tenth seatbelt payout length threshold and the eleventh seatbelt payout length threshold then the method 400 continues at block 492 where a determination is made whether the seatbelt payout is less than the eleventh seatbelt payout length threshold. If at block 492, a determination is made that the seatbelt payout length is less than the eleventh seatbelt payout length threshold, then the method 400 continues at block 493 where a message is provided to the vehicle occupants, a ride action is taken, and/or a measured stored static length, restraint/seat status and occupant/CRS classification/posture is stored. The message provided to the vehicle occupants are visual, audible, haptic, or a combination thereof. For example, the messages and ride actions that may be taken are: a) warning the occupant that the latchplate is buckled in the incorrect buckle, b) warning the occupant that a fake latchplate is buckled in the buckle, c) suppressing selected restraints, d) instructing the occupant to unbuckle and re-buckle, e) instructing the adjacent occupant to buckle into the correct buckle, f) preventing the ride from starting, g) taking the vehicle and parking the vehicle in a local low risk location, h) contacting the home office that oversees the vehicle service to reset the system, view the interior environment to assess the situation or dialogue with the occupant and i) turning on a message icon, making a dinging sound, playing an audible message, vibrating a seat or some combination thereof. Parameters can be stored such as the occupant classification, the stored static length of the seatbelt, the occupant posture, the seatbelt buckle status, the seat location, the guide loop location, and any decision to enable or suppress deployment of specific restraints. After block 493 the method returns to block 102. Alternately, after block 493 in another embodiment of the present disclosure the method returns to block 103.

If at block 492 the seatbelt payout is not less than the eleventh seatbelt payout length threshold, then the method 400 continues at block 494 where a determination is made whether an ALR has been engaged after buckling. If a determination has been made that the ALR has been engaged after buckling then the method 400 continues at block 495 where a message is provided to the vehicle occupants, a ride action is taken, and/or a measured stored static length, restraint/seat status and occupant/CRS classification/posture is stored. The message provided to the vehicle occupants are visual, audible, haptic, or a combination thereof. For example, the messages and ride actions that may be taken are: a) suppressing selected restraints, b) warning that the automatic locking retractor (ALR) function has been set for a small sized occupant, c) instructing the occupant to unbuckle and re-buckle, d) warning that a small occupant is not using a child restraint seat, e) preventing the ride from starting, f) taking the vehicle and parking the vehicle in a local low risk location, and g) remotely resetting the system, h) viewing the interior environment to assess the situation or dialogue with the occupant, i) enabling a ride because a properly restrained object or child restraint is present, and j) turning on a message icon, making an audible sound, playing an audible message, vibrating a seat or some combination thereof. Parameters can be stored such as the occupant classification, the stored static length of the seatbelt, the occupant posture, the seatbelt buckle status, the seat location, the guide loop location, and any decision to enable or suppress deployment of specific restraints. After block 495 the method returns to block 102. Alternately, after block 495 in another embodiment of the present disclosure the method returns to block 103.

If at block 494 a determination has been made that the ALR has not been engaged after buckling then the method 400 continues at block 496 where a message is provided to the vehicle occupants, a ride action is taken and/or a measured stored static length, restraint/seat status and occupant/CRS classification/posture is stored. For example, ride actions that may be taken are: a) enabling a ride because a properly restrained small occupant is present, b) messaging the occupant to inform them that they are properly restrained, c) suppressing the deployment of selected restraints, d) warning the occupants that an improperly restrained object or child restraint seat is present, e) preventing the ride from starting, f) taking the vehicle and parking the vehicle in a local low risk location, g) remotely resetting the system, h) viewing the interior environment to assess the situation or dialogue with the occupant, and i) turning on a message icon, making an audible sound, playing an audible message, vibrating a seat or some combination thereof. Parameters can be stored such as the occupant classification, the stored static length of the seatbelt, the occupant posture, the seatbelt buckle status, the seat location, the guide loop location, and any decision to enable or suppress deployment of specific restraints. After block 496 the method continues to block 103.

Figure 6:
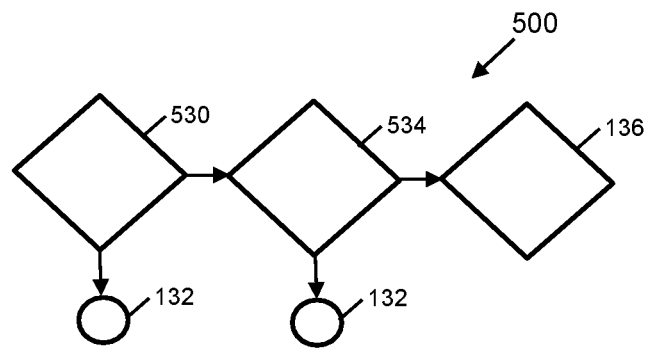
FIGS. 6 and 7 are a flowchart and chart illustrating a method and a threshold for occupant measurement within a threshold corridor, according to an exemplary embodiment.
Figure 7:
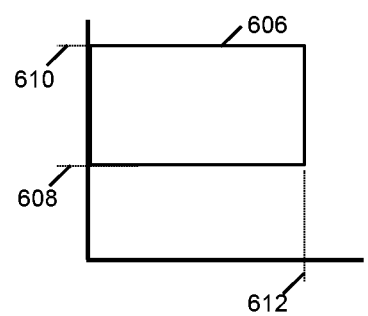

Referring now to FIGS. 6 and 7, a flowchart and chart illustrating a method 500 and a threshold for occupant measurement within a threshold corridor. The method starts at block 130 of method 100, referred to as block 530 of method 500, where a determination is made whether an occupant is present in the vehicle seat at the time of buckling. If at block 530 a determination is made that an occupant is not present in the vehicle seat at the time of buckling, then the method continues at block 132 of method 100. However, if at block 530 a determination is made that an occupant is present in the vehicle seat at the time of buckling then the method 500 continues at block 534. At block 534 a determination is made whether the occupant measurements have changed beyond the corridor 606 shown in FIG. 7. As shown in FIG. 7, the corridor 606 is defined by a lower limit of an amount or rate of occupant measurement change 608 to an upper limit of an amount or rate of occupant measurement change 610 over a predefined time threshold 612. The rate of occupant measurement change can be related to sensed mass, size, volume, location and alike of the occupant.

If at block 534, a determination is made that the occupant measurements have changed beyond the corridor 606, then method 500 continues to block 132 of method 100. However, if at block 534 a determination is made that the occupant measurements have not changed beyond the corridor 606, then the method 500 continues to block 136 of method 100 where a determination is made whether the ALR has been engaged after buckling. As an alternative, if at block 530 a determination is made that an occupant is present in the vehicle seat at the time of buckling then the method 500 skips block 534 and continues at block 136.

Figure 8:
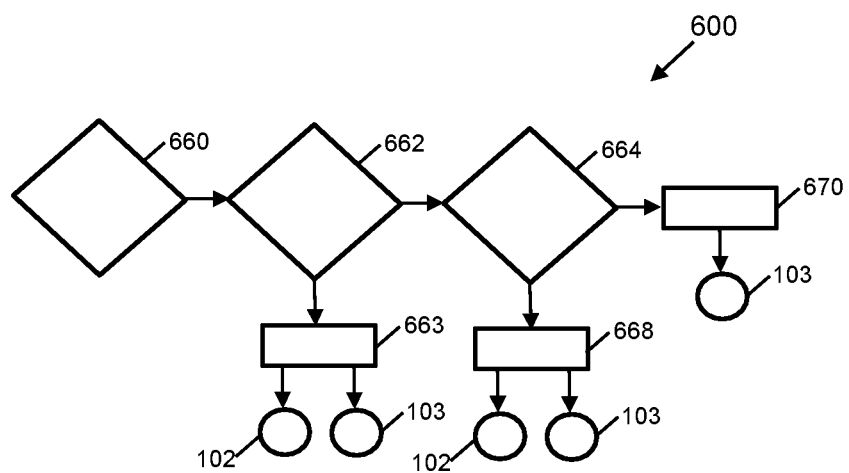
FIG. 8 is a flowchart illustrating a method for determining whether the seatbelt has tightened or loosened after an ALR has been engaged, according to an exemplary embodiment.

Referring now to FIG. 8, a flowchart illustrating a method 600 for determining whether the seatbelt has tightened or loosened after an ALR has been engaged. The method starts at block 160 of method 100, referred to as block 660 of method 600 where a determination is made whether the ALR has been engaged after buckling. If at block 660 a determination is made that the ALR has been engaged after buckling, then the method 600 continues at block 662. At block 662 a determination is made whether the seatbelt has loosened. For example, sensors that monitor seat movement may be used to determine if the seat has moved and then seatbelt loosening can be inferred. Alternatively, a seatbelt tension sensor may be used to determine if the seatbelt has loosened. If at block 662 a determination is made that the seatbelt has loosened, then the method 600 continues at block 663. At block 663 a message is provided to the vehicle occupants, a ride action is taken, and/or a measured stored static length, restraint/seat status and occupant/child restraint seat classification/posture is stored. The message provided to the vehicle occupants are visual, audible, haptic, or a combination thereof. For example, the messages and ride actions that may be taken are: a) suppressing at least one deployable restraint, b) instructing the occupant to tighten the seatbelt around the child restraint seat, c) instructing the occupant to re-install and rebuckle the child restraint seat, d) preventing the ride from starting, e) taking the vehicle and parking the vehicle in a local low risk location, f) remotely resetting the system, view the interior environment to assess the situation or dialogue with the occupant and g) turning on a message icon, making an audible sound, vibrating a seat or some combination thereof. Parameters can be stored such as the occupant classification, the stored static length of the seatbelt, the occupant posture, the seatbelt buckle status, the seat location, the guide loop location, and any decision to enable or suppress deployment of specific restraints. After block 663 the method returns to block 102. Alternately, after block 663 in another embodiment of the present disclosure the method returns to block 103.

However, if at block 662 a determination is made that the seatbelt has not loosened, then the method 600 continues at block 664. Alternatively, if at block 662 a determination is made that the seatbelt has not loosened, method 600 continues to block 670. At block 664 a determination is made whether the seatbelt has tightened. For example, sensors that monitor seat movement may be used to determine if the seat has moved and then seatbelt tightening can be inferred. Alternatively, a seatbelt tension sensor may be used to determine if the seatbelt has tightened. If at block 664 a determination is made that the seatbelt has not tightened, then the method 600 continues at block 668.

At block 668 a message is provided to the vehicle occupants, a ride action is taken, and/or a measured stored static length, restraint/seat status and occupant/child restraint seat classification/posture is stored. The message provided to the vehicle occupants are visual, audible, haptic, or a combination thereof. For example, the messages and ride actions that may be taken are: a) suppressing at least one deployable restraint, b) instructing the occupant to tighten the seatbelt around the child restraint seat, c) instructing the occupant to re-install and rebuckle the child restraint seat, d) preventing the ride from starting, e) taking the vehicle and parking the vehicle in a local low risk location, f) remotely resetting the system, view the interior environment to assess the situation or dialogue with the occupant and g) turning on a message icon, making an audible sound, vibrating a seat or some combination thereof. Parameters can be stored such as the occupant classification, the stored static length of the seatbelt, the occupant posture, the seatbelt buckle status, the seat location, the guide loop location, and any decision to enable or suppress deployment of specific restraints. After block 668 the method returns to block 102. Alternately, after block 668 in another embodiment of the present disclosure the method returns to block 103.

However, if at block 664 a determination is made that the seatbelt has tightened, then the method 600 continues at block 670. At block 670 a ride action is taken and/or a measured stored static length, restraint/seat status and occupant/CRS classification/posture is stored. For example, ride actions that may be taken are: a) enabling a ride because a properly restrained child restraint seat is present, b) messaging the occupants to inform them that the child restraint seat is properly restrained and optionally reminding them to properly buckle the child into the child restraint seatbelt system, c) suppressing the deployment of selected restraints, and d) turning on a message icon, making an audible sound, playing an audible message, vibrating a seat or some combination thereof. Parameters can be stored such as the occupant classification, the stored static length of the seatbelt, the occupant posture, the seatbelt buckle status, the seat location, the guide loop location, and any decision to enable or suppress deployment of specific restraints. After block 662 the method continues to block 103. As another alternative, if at block 660, a determination is made that the ALR was engaged after buckling, method 600 skips block 662 and continue at block 664.

Figure 9:
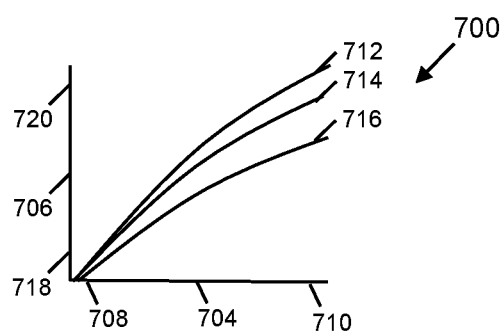
FIGS. 9 and 10 are charts illustrating how the seatbelt payout thresholds vary according to seat and guide loop movement, according to an exemplary embodiment.

Referring now to FIGS. 9 and 10, charts 700 and 702 illustrating how the seatbelt payout thresholds vary according to seat and guide loop movement, in accordance with an embodiment of the present invention. With respect to FIG. 9, chart 700 has on a horizontal axis 704 seat movement and on a vertical axis 706 seatbelt payout length. Seat movement ranges from a more rearward, either reclined or more vertical, either higher or lower 708 to a more forward, either reclined or more vertical, either higher or lower 710. A first predetermined seatbelt payout length threshold 712 varies from a more rearward seat position 708 and less seatbelt payout length 718 to a more forward seat position 710 and more seatbelt payout length 720. A seatbelt payout length threshold 714 varies from a more rearward seat position 708 and less seatbelt payout length 718 to a more forward seat position 710 and more seatbelt payout length 720. Another seatbelt payout length threshold 714 varies from a more rearward seat position 708 and less seatbelt payout length 718 to a more forward seat position 710 and more seatbelt payout length 720. Moreover, the slopes of the threshold curves 712, 714, 716 and the curve shapes may be different than what is shown as an example in FIG. 9.

With respect to FIG. 10, graph 702 has on a horizontal axis 722 guideloop movement and on a vertical axis 724 seatbelt payout length. Horizontal axis 722 guideloop movement ranges from lower guideloop movement 726 to higher guideloop movement 728. A seatbelt payout length threshold 734 varies from a lower guideloop movement 726 and less seatbelt payout length 730 to a more seatbelt payout length 732 and higher guideloop movement 728. Another seatbelt payout length threshold 736 varies from a lower guideloop movement 726 and less seatbelt payout length 730 to a more seatbelt payout length 732 and higher guideloop movement 728. Yet another seatbelt payout length threshold 738 varies from a lower guideloop movement 726 and less seatbelt payout length 730 to a more seatbelt payout length 732 and higher guideloop movement 728. Moreover, the slopes of the threshold curves 734, 736, 738 and the curve shapes may be different than what is shown as an example in FIG. 10.

Referring now to FIG. 11, a flowchart of a method 1000 for determining a seatbelt payout length and adjusting any of the above identified thresholds after an occupant has moved the vehicle seat. Method 1000 is initiated at block 1002 where the seatbelt payout length is saved as a baseline seatbelt payout length. The seatbelt payout length saved could be the previously saved stored static length or the seatbelt payout length at the time of seat movement. The choice is a calibratable input or hard coded into the method. At block 1004, the vehicle seat is adjusted by the occupant. Method 1000 continues from block 1004 to block 1006, where a new seatbelt payout length is saved as the stored static length and any of the above identified thresholds are saved after seat travel has stopped. After block 1006, method 1000 proceeds to block 1005 to the next routing detection method.

Referring now to FIG. 12, a flowchart illustrating an alternate method 1010 for determining a new seatbelt payout length and adjusting any of the above identified thresholds after an occupant has moved the vehicle seat. Method 1010 is initiated at block 1012 where the seatbelt payout length is saved as a baseline seatbelt payout length. The payout length saved could be the previously saved stored static length or the seatbelt payout length at the time of seat movement. The choice is a calibratable input or hard coded into the method. At block 1014, the vehicle seat is adjusted by the occupant. At block 1016, the seatbelt payout length and vehicle seat movement are monitored. At block 1018, a determination is made whether the seatbelt payout length changed proportional to the vehicle seat movement. If at block 1018, a determination is made that the seatbelt payout length changed proportional to the vehicle seat movement, then the method 1010 continues from block 1018 to block 1020 where a new seatbelt payout length is saved as the stored static length and any of the above identified thresholds are adjusted and saved after seat travel has stopped. After block 1020, method 1000 proceeds to block 1005 to the next routing detection method 1040. However, if at block 1018, a determination is made that the seatbelt payout length change is not proportional to the vehicle seat movement, then the method 1010 continues from block 1018 to block 1022 where a message is provided to the vehicle occupants, a ride action is taken, or both are provided. Messages can be visual, audible, haptic, or a combination of thereof. Examples of messages and ride actions taken are: a) instructing the occupant to unbuckle and re-buckle properly, b) instructing the occupant to readjust the seat, c) preventing the ride from starting, d) taking the vehicle and parking the vehicle in a local low risk location, e) contacting the home office that oversees the vehicle service to reset the system, view the interior environment to assess the situation or dialogue with the occupant and g) turning on a message icon, making a dinging sound, vibrating a seat or some combination of these. After block 1022 the method 1010 returns to block 905 or continues to block 1005 to the next routing method 1040.

With reference to FIG. 13, a chart of the range of acceptable seatbelt payout lengths is shown for a given seat movement in order to confirm that the measured seatbelt payout length is correct. An example of how the seatbelt payout length 1030 varies within an acceptable range 1032 relative to the saved payout length on the vertical axis 1034 and the seat movement on the horizontal axis 1035. On the horizontal axis the seat movement varies from a from a more reclined or more vertical, more rear, either lower or higher seat position 1036 to a more reclined or more vertical, more forward, either lower or higher seat position 1038. On the vertical axis 1034 the seatbelt payout length varies from a small seatbelt payout length 1040 to a large seatbelt payout length 1042. For example, seat movement includes: vertical movement, fore-aft movement, a seat bottom rotation movement, a seat back rotation movement, a seat bottom extension movement, a lumbar extension movement. Alternatively, more than one seat movement may be represented on one axis as a compiled seat movement of several individual movements. The perimeter of the acceptable range 1032 defines a seat difference threshold. Acceptable range 1032 of seatbelt payout length may be defined to have different shapes and location in FIG. 13.

Figure 14:
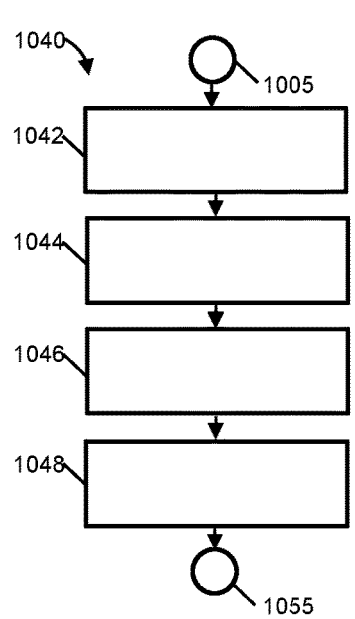
FIG. 14 a flowchart of a method for determining a seatbelt payout length and adjusted thresholds after an occupant has moved the guide loop, according to an exemplary embodiment.

Referring now to FIG. 14, a flowchart of a method 1040 for determining a seatbelt payout length and adjusted thresholds after an occupant has moved the guide loop. Method 1040 is initiated at block 1042 where the seatbelt payout length is saved as a baseline length. The saved seatbelt payout length is the previously saved stored static seatbelt length or the seatbelt payout length at the time of guide loop movement. The choice is a calibratable input or hard coded into the method. At block 1044, the guide loop is adjusted by the occupant. At block 1046, guide loop movement is monitored. Method 1040 continues from block 1046 to block 1048, where the seatbelt payout length is saved as the stored static length and thresholds are saved after guide loop travel has stopped. After block 1048, method 1040 proceeds to block 1055 to the next routing detection method 1050.

Figure 15:
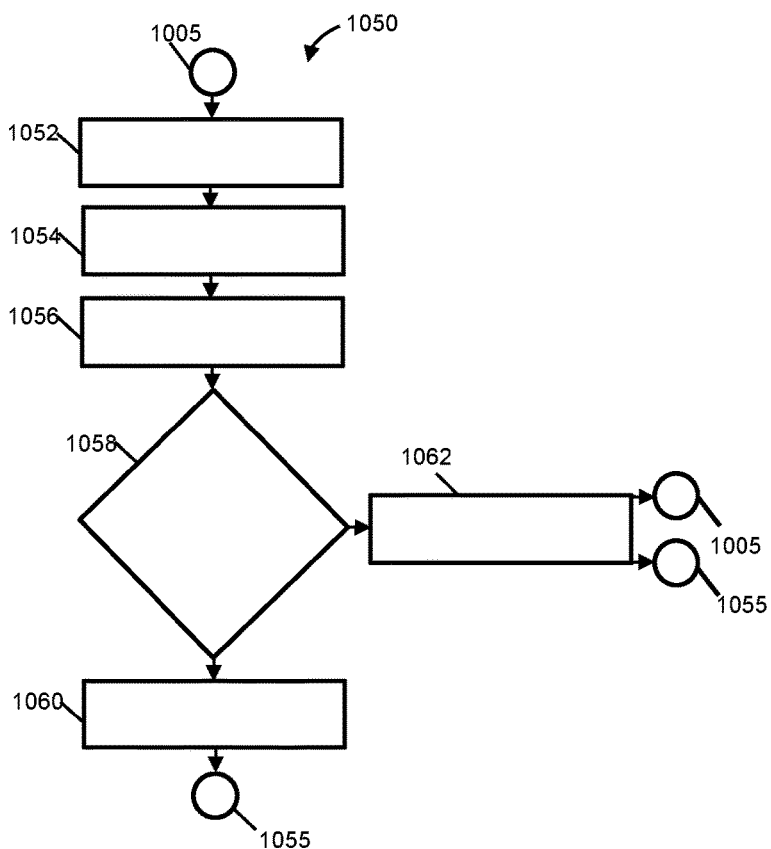
FIG. 15 a flowchart of an alternate method for determining a seatbelt payout and adjusted thresholds after an occupant has moved the guide loop, according to an exemplary embodiment.

Referring now to FIG. 15, a flowchart of an alternate method 1050 for determining a seatbelt payout and adjusted thresholds after an occupant has moved the guide loop. Method 1050 is initiated at block 1052 where the seatbelt payout length is saved as a baseline length. The payout saved is the previously saved stored static length or the seatbelt payout length at the time of seat movement. The choice is a calibratable input or hard coded into the method. At block 1054, the guide loop is adjusted by the occupant. At block 1056, the seatbelt payout and guide loop movement are monitored. At block 1058, a determination is made whether the seatbelt payout changed proportional to the guide loop movement. If at block 1058, a determination is made that the seatbelt payout length has changed proportional to the guide loop movement, then the method 1050 continues from block 1058 to block 1060 where the seatbelt payout length is saved as the stored static length and thresholds are saved after guide loop travel has stopped. After block 1060, method 1050 proceeds to block 1055 to the next routing detection method. However, if at block 1058, a determination is made that the seatbelt payout length change is not proportional to the guide loop movement, then the method 1050 continues from block 1058 to block 1062 where a message is provided to the vehicle occupants, a ride action is taken, or both are provided. Messages can be visual, audible, haptic, or a combination of thereof. Examples of messages and ride actions taken are: a) instructing the occupant to unbuckle and re-buckle properly, b) instructing the occupant to readjust the guide loop, c) preventing the ride from starting, d) taking the vehicle and parking the vehicle in a local low risk location, e) contacting the home office that oversees the vehicle service to reset the system, view the interior environment to assess the situation or dialogue with the occupant and g) turning on a message icon, making a dinging sound, vibrating a seat or some combination of these. After block 1062 the method 1050 returns to block 1005 or continues to block 1055 to the next routing detection method.

Figure 16:
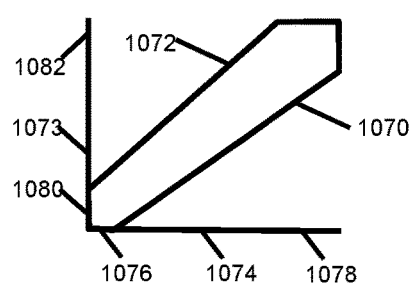
FIG. 16 a chart illustrating the range of acceptable seatbelt payout lengths for a given guide loop movement in order to confirm that the measured payout length is correct, according to an exemplary embodiment.

With reference to FIG. 16, a chart illustrating the range of acceptable seatbelt payout lengths for a given guide loop movement in order to confirm that the measured payout length is correct. An example of how the seatbelt payout length 1070 varies within an acceptable range 1072 relative to the payout length saved on the vertical axis 1073 and the guide loop movement on the horizontal axis 1074. The perimeter of the acceptable range 1072 defines a guide loop difference threshold. Acceptable range 1072 of seatbelt payout length may be defined to have different shapes and location. The guide loop movement varies from a lower guide loop position 1076 to a higher guide loop position 1078. The seatbelt payout length varies from a lesser payout length 1080 to a greater payout length 1082.

There are several variations which are possible within the scope of this disclosure. Static payout length may be calculated numerous ways. For example, the actual payout length or distance value is when the seatbelt is buckled, or the average payout length value over a time threshold during and after the time of seatbelt buckling, or the minimum payout length or distance value over a time threshold during and after the time of seatbelt buckling (to account for an occupant leaning forward or twisting while buckling), or the average or minimum payout length or distance value between a first time threshold and a second time threshold after buckling, or the minimum payout value before the seatbelt payout increases (or increases beyond a threshold), or limited to within a time threshold window after buckling.

Any of the above referenced thresholds can be programmed into the algorithms or methods directly or as a calibratable feature that can be input as an entry to the base algorithms. Many of the cited thresholds can be discrete values or values that are adjustable. Also, the algorithms can be repeated with a different threshold where more severe warnings and ride actions are taken with larger thresholds and less severe warnings and ride actions are taken with smaller thresholds. The algorithm or method order can also be switched, and two or more algorithms can run concurrently.

Seat belt webbing payout sensors 26, buckle sensors 22, occupancy sensors 24, 25, can use instantaneously detected values or can use values sampled over a time period. The sampling time period could be varied by sensor type or the condition, i.e. a) vehicle stationary vs vehicle moving, b) ride not started vs ride started, and c) sensor response in to the method not changed vs sensor response into the method changed.

In addition, the method described herein can cycle back and forth between decision boxes as samples are taken and processed, and decisions become more statistically accurate. The method can run continuously or can run at intervals that are time based, vehicle movement state based, sensed restraint condition based, and occupant movement based.

The present disclosure also contemplates that all the algorithms or methods, a portion of the algorithms or methods, all the associated sensors, or a portion of the sensors may go to sleep or be halted to save energy in select cases such as once the vehicle is moving. For example, the seatbelt buckle sensor may remain active but the seatbelt payout sensor and associated algorithms or methods may go to sleep or be deactivated while the vehicle is moving or until the vehicle re-enters a parked state.

In addition, messages and ride actions may be specific to the detected condition or a common approach can be taken. For instance, the standard buckle seatbelt icon in vehicles can be displayed if a misrouted seatbelt condition is detected. There can also be one or more time delays to run an algorithm, warn, or take vehicle action so that people have the ability to adjust their posture and nearby brought aboard personal objects in the vehicle including quickly reach for objects without causing a warning or a ride action to occur. These delays can be specific to certain parts of the algorithms, certain messages and certain ride actions. They can also be calibratable delays or the delays could be hard coded into the algorithm. In addition, the messages and ride actions may be applied in an escalating format where for instance, a visual warning is first communicated, followed by an audible message, followed by a haptic message, followed by a ride action that doesn't stop the vehicle, followed by a ride action that stops the vehicle. The delays between these events may be specific to certain parts of the algorithms or methods or calibratable delays or the delays may be hard coded into the algorithm or method.

Ride actions can also involve either enabling or suppressing certain deployable restraints such as one or more airbags or one or more seatbelt pretensioners. Ride actions can also involve enabling or suppressing customer convenience features, such as the ability to listen to audio or watch video on a screen.

Additionally, the order of the decision blocks in the method herein described above can be changed where the output of one decision block does not affect another decision block. For example, blocks 110 and 116 can be ordered so that block 116 precedes block 110.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for detecting seatbelt routing in a motor vehicle safety restraint system for a motor vehicle seat, the system comprising:
   a seatbelt buckle sensor for sensing a presence of a seatbelt latchplate in a seatbelt buckle;
   a seatbelt payout sensor for sensing a seatbelt payout length;

a control module in communication with the seatbelt buckle sensor and the seatbelt payout sensor, wherein the control module includes executable code to:
compare the seatbelt payout length to a first seatbelt payout length threshold;
determine seatbelt routing based on whether seatbelt latchplate is present in the seatbelt buckle, the comparison of the seatbelt payout length with the first seatbelt payout length threshold, and whether the seatbelt payout length is equal to or greater than the first seatbelt payout length threshold; and
determine seatbelt routing further based on whether the seatbelt payout length has been reduced to between a second seatbelt payout length threshold and a third seatbelt payout length threshold if the seatbelt payout length is not equal to or greater than the first payout length threshold, wherein the second and third payout length thresholds are adjustable based on one of seat movement and guideloop position movement.

2. The system of claim 1, wherein the control module further comprises executable code to: determine that a small person is properly belted when the presence of the seatbelt latchplate in the seatbelt buckle is sensed, the seatbelt payout length after the presence of the seatbelt latchplate in the seatbelt buckle is sensed is less than the first seatbelt payout length threshold after the presence of the seatbelt latchplate in the seatbelt buckle is sensed.

3. The system of claim 2, further comprising an automatic locking retractor sensor in communication with the control module for sensing the engagement of the automatic locking retractor and wherein the control module further comprises executable code to: determine at least one of the small person is improperly belted and a small object is properly belted, when the presence of a seatbelt latchplate in the seatbelt buckle is sensed, the seatbelt payout length after the presence of the seatbelt latchplate in the seatbelt buckle is sensed the seatbelt payout length after the presence of a seatbelt latchplate in the seatbelt buckle is sensed is not less than the third seatbelt payout length threshold and the automatic locking retractor was engaged after the presence of a seatbelt latchplate in the seatbelt buckle is sensed.

4. The system of claim 1, wherein the control module further comprises executable code to: determine that at least one of a wrong latchplate is inserted in the seatbelt buckle and a fake latch plate is inserted in the seatbelt buckle, when the presence of a seatbelt latchplate in the seatbelt buckle is sensed, and the seatbelt payout length after the presence of the seatbelt latchplate in the seatbelt buckle is sensed is less than the second seatbelt payout length threshold.

5. The system of claim 1, further comprising an occupancy sensor in communication with the control module and wherein the control module further comprises executable code to: determine whether an occupant is present in the motor vehicle seat using the occupancy sensor.

6. The system of claim 5, wherein the control module further comprises executable code to: determine at least one of an improperly restrained large person and a properly restrained large object, when the seatbelt is determined to be buckled, the seatbelt payout is greater than or equal to the first seatbelt payout length threshold, when an occupant is determined to be present in the vehicle seat at the time of the latchplate is inserted into the buckle, when after the presence of a seatbelt latchplate in the seatbelt buckle is sensed the occupant is present in the motor vehicle seat more than a time period threshold within a time period window and an automatic locking retractor was engaged after the presence of a seatbelt latchplate in the seatbelt buckle is sensed.

7. The system of claim 5, wherein the control module further comprises executable code to: determine at least one of a properly belted large person and an improperly belted large object, when the presence of a seatbelt latchplate in the seatbelt buckle is sensed, the seatbelt payout length is greater than or equal to the first seatbelt payout length, an occupant is determined to be present in the vehicle seat, after the presence of the seatbelt latchplate in the seatbelt buckle is sensed the occupant is present in the seat more than a time period threshold and within a time period window.

8. The system of claim 5, further comprising an automatic locking retractor sensor in communication with the control module for sensing the engagement of the automatic locking retractor and wherein the control module further comprises executable code to: determine at least one of an improperly belted child restraint seat and an improperly belted object when the presence of the seatbelt latchplate in the seatbelt buckle is sensed, the seatbelt payout is greater than or equal to the first seatbelt payout length threshold, an occupant is determined to be present in the motor vehicle seat, after the presence of the seatbelt latchplate in the seatbelt buckle is sensed the occupant is not present in the seat more than a time period threshold within a time period window and the automatic locking retractor was not engaged after the seatbelt was buckled.

9. The system of claim 8, wherein the control module further comprises executable code to: determine at least one of an improperly belted child restraint seat and an improperly belted object when the presence of the seatbelt latchplate in the seatbelt buckle is sensed, the seatbelt payout is greater than or equal to the first seatbelt payout length threshold, an occupant is determined to not be present in the vehicle seat, and the automatic locking retractor was not engaged after the seatbelt was buckled.

10. The system of claim 5, further comprising an automatic locking retractor sensor in communication with the control module for sensing the engagement of the automatic locking retractor and wherein the control module further comprises executable code to: determine at least one of a properly belted child restraint seat and a properly belted object when the presence of a seatbelt latchplate in the seatbelt buckle is sensed, the seatbelt payout length is greater than or equal to the first seatbelt payout length threshold, an occupant is present in the motor vehicle seat, when after the presence of the seatbelt latchplate in the seatbelt buckle is sensed the occupant was not present in the motor vehicle seat more than a time period threshold within a time period window, the automatic locking retractor was not engaged after the presence of the seatbelt latchplate in the seatbelt buckle is sensed and when after buckling the seatbelt payout length is increased by more than a first predetermined seatbelt payout length threshold and less than a second predetermined seatbelt payout length threshold within a time period window.

11. A method for detecting seatbelt routing in a motor vehicle safety restraint system for a motor vehicle seat, the method comprising:
sensing a presence of a seatbelt latchplate in a seatbelt buckle;
sensing a seatbelt payout length;
comparing the seatbelt payout length to a first seatbelt payout length threshold;
determine seatbelt routing based on whether seatbelt latchplate is present in the seatbelt buckle, the comparison of the seatbelt payout length with the first seatbelt payout length threshold, and whether the seatbelt payout length is equal to or greater than the first seatbelt payout length threshold; and determine seatbelt routing further based on whether the seatbelt payout length has been reduced to between a second seatbelt payout length threshold and a third seatbelt payout length threshold if the seatbelt payout length is not equal to or greater than the first payout length threshold, wherein the second and third payout length thresholds are adjustable based on one of seat movement and guideloop position movement.

12. The method of claim 11, further comprising determining that a small person is properly belted when the presence of the seatbelt latchplate in the seatbelt buckle is sensed, the seatbelt payout length after the presence of the seatbelt latchplate in the seatbelt buckle is sensed is less than the first seatbelt payout length threshold after the presence of the seatbelt latchplate in the seatbelt buckle is sensed.

13. The method of claim 12, further comprising determining at least one of the small person is improperly belted and a small object is properly belted, when the presence of a seatbelt latchplate in the seatbelt buckle is sensed, the seatbelt payout length after the presence of the seatbelt latchplate in the seatbelt buckle is sensed the seatbelt payout length after the presence of a seatbelt latchplate in the seatbelt buckle is sensed is not less than the third seatbelt payout length threshold and the automatic locking retractor was engaged after the presence of the seatbelt latchplate in the seatbelt buckle is sensed.

14. The method of claim 11, further comprising determining that at least one of a wrong latchplate is inserted in the seatbelt buckle and a fake latch plate is inserted in the seatbelt buckle, when the presence of a seatbelt latchplate in the seatbelt buckle is sensed, and the seatbelt payout length after the presence of the seatbelt latchplate in the seatbelt buckle is sensed is less than the second seatbelt payout length threshold.

15. The method of claim 11, further comprising determining whether an occupant is present in the motor vehicle seat using an occupancy sensor.

16. The method of claim 15, further comprising determining at least one of an improperly restrained large person and a properly restrained large object, when the seatbelt is determined to be buckled, the seatbelt payout is greater than or equal to the first seatbelt payout length threshold, when an occupant is determined to be present in the vehicle seat at the time of the latchplate is inserted into the buckle, when after the presence of a seatbelt latchplate in the seatbelt buckle is sensed the occupant is present in the motor vehicle seat more than a time period threshold within a time period window and an automatic locking retractor was engaged after the presence of a seatbelt latchplate in the seatbelt buckle is sensed.

17. The method of claim 15, further comprising determining at least one of a properly belted large person and an improperly belted large object, when the presence of a seatbelt latchplate in the seatbelt buckle is sensed, the seatbelt payout length is greater than or equal to the first seatbelt payout length, an occupant is determined to be present in the vehicle seat, after the presence of the seatbelt latchplate in the seatbelt buckle is sensed the occupant is present in the seat more than a time period threshold and within a time period window.

18. The method of claim 15, further comprising determining at least one of an improperly belted child restraint seat and an improperly belted object when the presence of the seatbelt latchplate in the seatbelt buckle is sensed, the seatbelt payout is greater than or equal to the first seatbelt payout length threshold, an occupant is determined to be present in the motor vehicle seat, after the presence of the seatbelt latchplate in the seatbelt buckle is sensed the occupant is not present in the seat more than a time period threshold within a time period window and an automatic locking retractor was not engaged after the seatbelt was buckled.

19. The method of claim 15, further comprising determining at least one of an improperly belted child restraint seat and an improperly belted object when the presence of the seatbelt latchplate in the seatbelt buckle is sensed, the seatbelt payout is greater than or equal to the first seatbelt payout length threshold, an occupant is determined to not be present in the vehicle seat, and an automatic locking retractor was not engaged after the seatbelt was buckled.

20. The method of claim 15, further comprising determining at least one of a properly belted child restraint seat and a properly belted object when the presence of the seatbelt latchplate in the seatbelt buckle is sensed, the seatbelt payout length is greater than or equal to the first seatbelt payout length threshold, an occupant is present in the motor vehicle seat, when after the presence of the seatbelt latchplate in the seatbelt buckle is sensed the occupant was not present in the motor vehicle seat more than a time period threshold within a time period window, an automatic locking retractor was not engaged after the presence of the seatbelt latchplate in the seatbelt buckle is sensed and when after buckling the seatbelt payout length is increased by more than a first predetermined seatbelt payout length threshold and less than a second predetermined seatbelt payout length threshold within the time period window.

* * * * *